(12) United States Patent
Lee et al.

(10) Patent No.: US 12,468,471 B2
(45) Date of Patent: Nov. 11, 2025

(54) STORAGE DEVICES HAVING MULTIPLE STORAGE REGIONS

(71) Applicant: SAMSUNG ELECTRONICS CO., LTD., Suwon-si (KR)

(72) Inventors: Kwang-Jin Lee, Suwon-si (KR); Kirock Kwon, Suwon-si (KR); Chanho Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/741,452

(22) Filed: Jun. 12, 2024

(65) Prior Publication Data

US 2025/0103233 A1   Mar. 27, 2025

(30) Foreign Application Priority Data

Sep. 26, 2023 (KR) .................. 10-2023-0129141

(51) Int. Cl.
*G06F 3/06* (2006.01)
(52) U.S. Cl.
CPC .......... *G06F 3/0647* (2013.01); *G06F 3/0604* (2013.01); *G06F 3/0644* (2013.01); *G06F 3/0655* (2013.01)
(58) Field of Classification Search
CPC .... G06F 3/0647; G06F 3/0604; G06F 3/0644; G06F 3/0655
See application file for complete search history.

(56) References Cited

U.S. PATENT DOCUMENTS

| 10,332,322 | B2 | 6/2019 | Nix | |
|---|---|---|---|---|
| 10,698,808 | B2 | 6/2020 | Pandurangan et al. | |
| 2008/0244164 | A1 | 10/2008 | Chang et al. | |
| 2014/0071753 | A1* | 3/2014 | Shin | G06F 12/0246 365/185.01 |
| 2014/0101377 | A1* | 4/2014 | Oh | G06F 3/0604 711/103 |

(Continued)

FOREIGN PATENT DOCUMENTS

| JP | 2014-204315 | 10/2014 |
|---|---|---|
| KR | 10-2020-0052150 | 5/2020 |
| WO | WO 2023/009560 A1 | 2/2023 |

OTHER PUBLICATIONS

Kang et al., "The Multi-Streamed Solid-State Drive," 6th USENIX Workshop on Hot Topics in Storage and File Systems, Jun. 2014, 7 pages.

*Primary Examiner* — Ryan Bertram
(74) *Attorney, Agent, or Firm* — Fish & Richardson P.C.

(57) ABSTRACT

A storage device includes a non-volatile memory and a storage controller. The non-volatile memory includes a plurality of storage regions, and the plurality of storage regions include a first storage region and a second storage region which have different types. The storage controller programs data from a host device in the first storage region, based on safety level information of the host device and remaining storage region information of the non-volatile memory. Based on the safety level information and the remaining storage region information, the storage controller migrates the data programmed in the first storage region to the second storage region or returns the data migrated to the second storage region to the first storage region.

20 Claims, 20 Drawing Sheets

(56) References Cited

U.S. PATENT DOCUMENTS

| | | | |
|---|---|---|---|
| 2015/0213896 A1* | 7/2015 | Lieber | G11C 16/3495 |
| | | | 711/103 |
| 2017/0090763 A1* | 3/2017 | Horn | G06F 3/0676 |
| 2020/0142638 A1 | 5/2020 | Byun | |
| 2021/0034514 A1 | 2/2021 | Cho et al. | |
| 2022/0043604 A1* | 2/2022 | Kurita | G06F 3/0604 |
| 2022/0283971 A1* | 9/2022 | Lee | G06F 13/4217 |
| 2022/0357863 A1 | 11/2022 | Christensen et al. | |
| 2023/0004649 A1 | 1/2023 | Su | |
| 2023/0104010 A1 | 4/2023 | Hashimoto | |
| 2023/0305719 A1* | 9/2023 | Monta | G07C 5/0841 |
| 2024/0028205 A1* | 1/2024 | Thiruchengode Vajravel | G06F 3/0611 |
| 2024/0078020 A1* | 3/2024 | Basu | G06F 3/0616 |
| 2024/0118692 A1* | 4/2024 | Kashani | G06F 9/5044 |
| 2024/0190372 A1* | 6/2024 | Sugiyama | H04L 12/28 |
| 2024/0419365 A1* | 12/2024 | Sharma | G06F 3/0689 |
| 2025/0004657 A1* | 1/2025 | Sharma | G06F 3/0685 |

\* cited by examiner

FIG. 3

| Device ID (DevID) | Safety Level Information (SFTLI) | Remaining Storage region Information (RMSSI) | Target Storage region |
|---|---|---|---|
| DEV1 | LEV1 | ST1 | SLCR |
|  |  | ST2 | MLCR |
| DEV2 | LEV2 | ST1 | MLCR |
|  |  | ST2 |  |

ST_MTBL 530-1
530-2

FIG. 4

Start
↓
Receive data program request — S100
↓
Program data from host device in first storage region — S300
↓
Migrate data programmed in first storage region to second storage region or return data migrated to second storage region to first storage region — S500
↓
End

FIG. 5C

L2P_MTBL

| LPN | PPN | Actual Storage Region (ASR) | Safety Level Information (SFTLI) | |
|---|---|---|---|---|
| LPN11 | PPN11 | SLCR | | ⎫ PBN11 |
| LPN12 | PPN12 | SLCR | | |
| LPN13 | PPN13 | SLCR | | |
| ⋮ | ⋮ | ⋮ | LEV1 | ⋮ |
| LPN1m | PPN1m | SLCR | | ⎭ PBN1n |
| LPN21 | PPN21 | MLCR | | ⎫ PBN21 |
| LPN22 | PPN22 | MLCR | | |
| LPN23 | PPN23 | MLCR | | |
| ⋮ | ⋮ | ⋮ | LEV1 | ⋮ |
| LPN2p | PPN2p | MLCR | | ⎭ PBN2q |
| LPN31 | PPN31 | MLCR | | ⎫ PBN31 |
| LPN32 | PPN32 | MLCR | | |
| LPN33 | PPN33 | MLCR | | |
| ⋮ | ⋮ | ⋮ | LEV2 | ⋮ |
| LPN3r | PPN3r | MLCR | | ⎭ PBN3s |

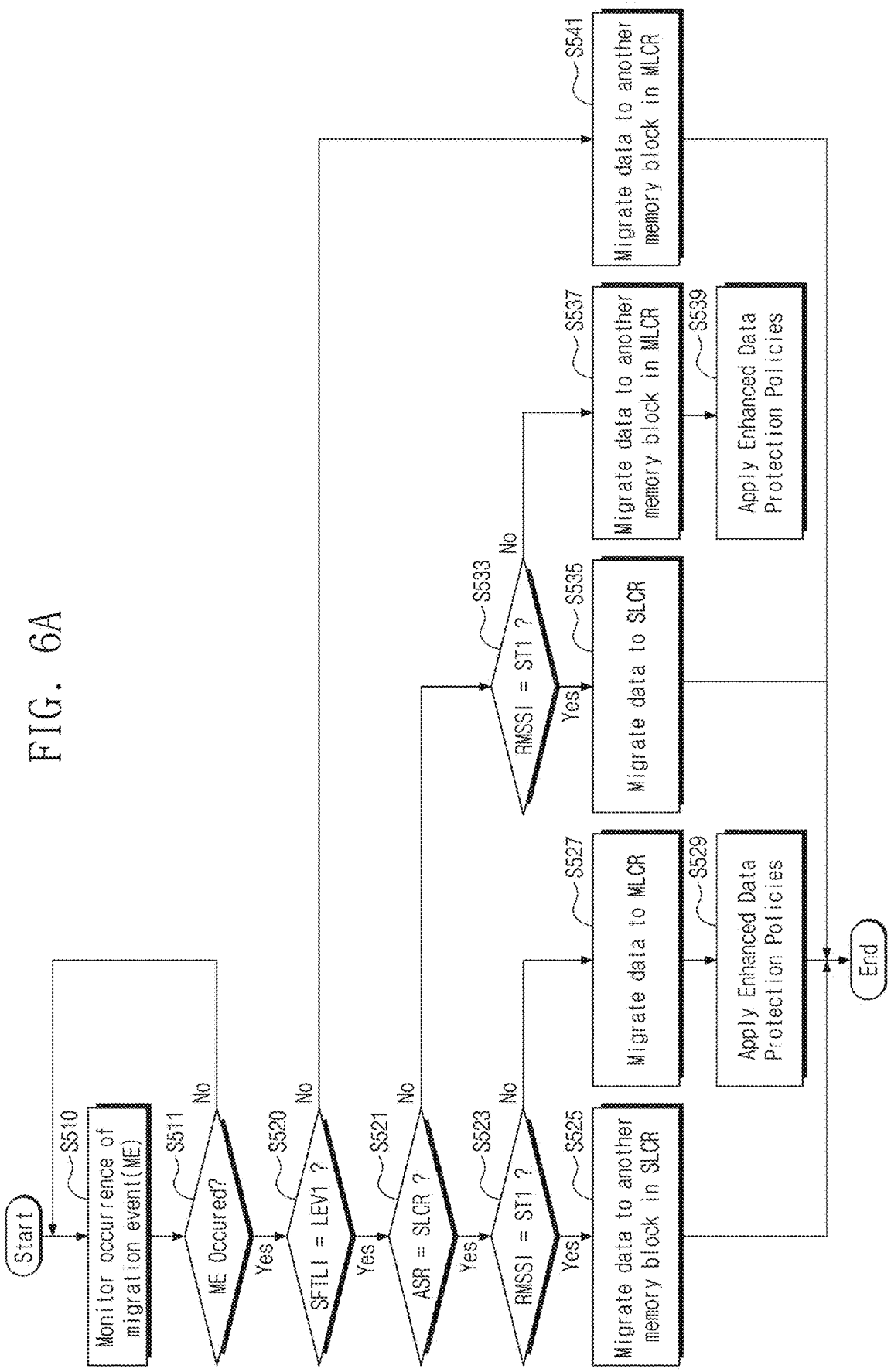

FIG. 9

ST_MTBL-1

| Core ID (CRID) | Safety Level Information (SFTLI) | | Remaining Storage region Information (RMSSI) | Target Storage region |
|---|---|---|---|---|
| CR1 | SFTL1 | LEV1 | ST1 | SLCR |
| CR2 | SFTL2 | | ST2 | MLCR — 530-3 |
| CR3 | SFTL3 | LEV2 | ST1 | MLCR — 530-4 |
| | | | ST2 | |

STORAGE DEVICES HAVING MULTIPLE STORAGE REGIONS

CROSS-REFERENCE TO RELATED APPLICATIONS

This application claims priority under 35 U.S.C. § 119 to Korean Patent Application No. 10-2023-0129141 filed on Sep. 26, 2023, in the Korean Intellectual Property Office, the disclosure of which is incorporated by reference herein in its entirety.

BACKGROUND

A vehicle system mounted on an autonomous vehicle may include one or more host devices with different purposes or functions and a storage device for storing a large amount of data generated in real time from each of the host devices. For example, the host devices may share the storage device, and the host devices may store data in storage regions of the storage device.

The storage regions of the storage device may be identical or different in type. For example, the storage regions of the storage device may include a single-level cell (SLC) region, a multi-level cell (MLC) region, a triple-level cell (TLC) region, a quadruple-level cell region, etc. The single-level cell region and the multi-level cell region have different characteristics in terms of data storage efficiency, costs, reliability, and speed.

SUMMARY

Some implementations of the present disclosure provide storage devices for efficiently storing and managing data in different storage regions, of the same type or different types, based on the different purposes and functions of one or more host devices in a vehicle system. Some implementations provide operating methods for the storage devices.

In some implementations, a storage device includes a non-volatile memory and a storage controller. The non-volatile memory includes a plurality of storage regions, and the plurality of storage regions include a first storage region and a second storage region which have different types. The storage controller programs data from a host device in the first storage region, based on safety level information of the host device and remaining storage region information of the non-volatile memory. Based on the safety level information and the remaining storage region information, the storage controller migrates the data programmed in the first storage region to the second storage region or returns the data migrated to the second storage region to the first storage region.

In some implementations, in an operating method of a storage device, data from a host device may be programmed in a first storage region, based on safety level information of the host device and remaining storage region information of a non-volatile memory. The non-volatile memory includes a plurality of storage regions, and the plurality of storage regions include the first storage region and a second storage region being different from each other in type. The data programmed in the first storage region are migrated to the second storage region, based on the safety level information and the remaining storage region information. The data migrated to the second storage region are returned to the first storage region, based on the safety level information and the remaining storage region information.

In some implementations, a storage device includes a non-volatile memory and a storage controller. The non-volatile memory includes a plurality of storage regions, and the plurality of storage regions include a first storage region and a second storage region which have different types. The storage controller programs data from a host device in the first storage region in a first program mode, based on automotive safety integrity level (ASIL) information of the host device and remaining storage region information of the non-volatile memory. Based on the ASIL information and the remaining storage region information, the storage controller reprograms the data programmed in the second storage region in the first program mode in the second storage region in a second program mode or again reprograms the data reprogrammed in the second program mode in the first storage region in the first program mode.

BRIEF DESCRIPTION OF THE FIGURES

The above and other objects and features of the present disclosure will become apparent by describing in detail embodiments thereof with reference to the accompanying drawings.

FIG. 3 is a diagram illustrating an example of a safety level-target storage region table according to some implementations.

FIG. 4 is a flowchart illustrating an example of an operating method of a storage device according to some implementations.

FIG. 5C is a diagram illustrating an example of a mapping table.

FIG. 6A is a flowchart illustrating an example of migrating data programmed in a first storage region to a second storage region of a storage device.

FIG. 9 is a diagram illustrating an example of a safety level-target storage region table.

DETAILED DESCRIPTION

Figure 1:
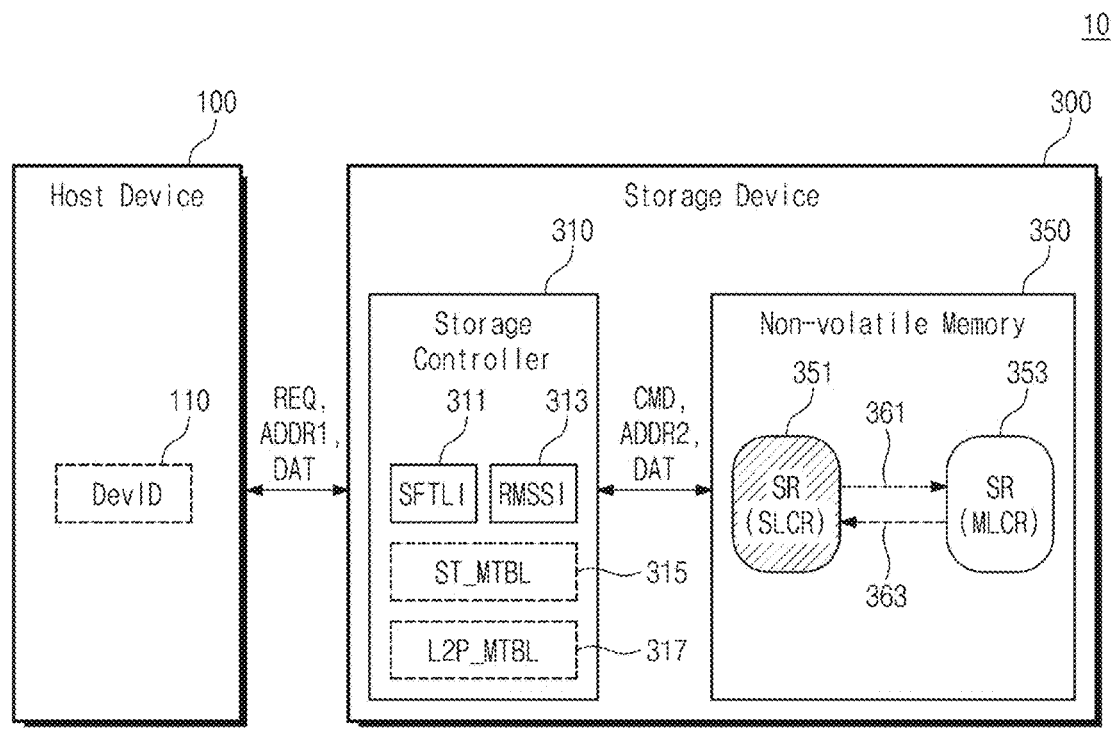
FIG. 1 is a block diagram illustrating an example of an electronic system including a storage device according to some implementations of the present disclosure.

FIG. 1 is a block diagram illustrating an electronic system including a storage device according to some implementations of the present disclosure.

Referring to FIG. 1, an electronic system 10 may include a host device 100 and a storage device 300. In some implementations, the electronic system 10 may be a vehicle system capable of being mounted on an autonomous vehicle, or the like. For convenience of description, only the host device 100 is illustrated in FIG. 1, but the electronic system 10 may further include one or more host devices which share the storage device 300 and transmit pieces of data in real time to the storage device 300.

The host device 100 may exchange data DAT with the storage device 300 by transmitting a request REQ and an address ADDR1 to the storage device 300. The storage device 300 may include a storage controller 310 and a non-volatile memory 350. To exchange the data DAT with the host device 100, the storage controller 310 may store the data DAT in the non-volatile memory 350 or may read the data DAT from the non-volatile memory 350 by generating a command CMD and an address ADDR2 based on the request REQ and the address ADDR1.

The non-volatile memory 350 may include a plurality of storage regions SRs which are identical or different in type and are used to store the data DAT received from the host device 100. For example, as illustrated in FIG. 1, the plurality of storage regions SRs may include storage regions 351 and 353. The storage region 351 may be a "single level cell region" which includes a plurality of single level cells each storing one bit, and the storage region 353 may be a "multi-level cell region" which includes a plurality of multi-level cells each storing two bits. The single level cell region may provide higher reliability and a faster speed than the multi-level cell region but may be associated with high costs due to having lower storage efficiency than the multi-level cell region. Below, for convenience of description, the term "multi-level cell region" may be used to represent storage regions including a plurality of memory cells each storing two or more bits. For example, despite the name, the multi-level cell region may include a triple level cell region and a quadruple level cell region and may mean a storage region which is not the single level cell region.

The storage controller 310 may program the data DAT in a first storage region based on safety level information 311 and remaining storage region information 313; based on the safety level information 311 and the remaining storage region information 313, the storage controller 310 may migrate the data stored in the first storage region to a second storage region (e.g., 361) or may return the data moved to the second storage region to the first storage region (e.g., 363). To this end, the storage controller 310 may determine a target storage region being a storage region of the non-volatile memory 350, in which the data DAT from the host device 100 are programmed for the first time, time points of the migration or the return, storage regions for the migration or the return, and priorities of pieces of data targeted for the migration or the return.

In some implementations, the safety level information 311 may indicate importance of the data DAT. The importance of the data DAT may be set for each host device in consideration of the influence of the data DAT on the safety of a vehicle on which the electronic system 10 is mounted.

For example, the importance of the data DAT may be set based on a type of the host device 100. When a host device has a relatively great influence on the safety of the vehicle, the importance of the data DAT from the host device may be set to be relatively high. When a host device has a relatively small influence on the safety of the vehicle, the importance of the data DAT from the host device may be set to be relatively low. This will be described with reference to FIGS. 2 to 4, 5A, 5B, 5C, 6A, 6B, 7A, 7B, 8, 9, 10A, 10B, 11A, 11B, 12A and 12B.

For example, the importance of the data DAT may be set based on the automotive safety integrity level (ASIL) assigned for each host device in compliance with the international organization for standardization (ISO) 26262. As the ASIL assigned to the host device 100 becomes higher, the importance of the data DAT from the host device 100 may be set to be higher. As the ASIL assigned to the host device 100 becomes lower, the importance of the data DAT from the host device 100 may be set to be lower. This will be described with reference to FIG. 13.

In some implementations, the remaining storage region information 313 may indicate whether the size of a remaining region is sufficient enough to program new data in a single level cell region SLCR included in the non-volatile memory 350. The size of the remaining region may be calculated by monitoring the number of memory blocks included in each storage region in real time, that is, the number of free blocks, the number of used blocks, and the total number of blocks in real time.

In some implementations, the first storage region may be the "initial storage region" of the non-volatile memory 350, in which the data DAT are stored for the first time, and the type of the second storage region may be identical to or different from the type of the first storage region.

In some implementations, the storage controller 310 may detect the occurrence of a "migration event" or a "return event", the migration of programmed data may be initiated by the occurrence of the migration event, and the return of the migrated data may be initiated by the occurrence of the return event.

The storage controller 310 may further include a safety level-target storage region table (ST_MTBL) 315 and a mapping table (L2P_MTBL) 317. The safety level-target storage region table 315 may in advance define types of various host devices including the host device 100, types of importance of data from each of the various host devices, types of a size of a remaining region, and types of a target storage region, and the mapping table 317 may indicate types of importance of data from each of the host devices and types of storage regions of the non-volatile memory 350, in which data from each of the host devices are actually stored.

The storage controller 310 may perform the programming of the data DAT, the migration of the programmed data, or the return of the migrated data based on the safety level-target storage region table (ST_MTBL) 315 and/or the mapping table (L2P_MTBL) 317. For example, the storage controller 310 may further receive a device ID (DevID) 110 from the host device 100 and may use a variety of information defined with respect to the data DAT by identifying the type of the host device 100 or the importance of the data DAT from the host device 100 from the safety level-target storage region table 315 or the mapping table 317 based on the device ID 110.

According to the above configuration, based on safety level information and remaining storage region information, a storage device according to some implementations of the present disclosure may program data with high importance in the single level cell region and may program data with low importance in the multi-level cell region. Even when the importance of data is high, the data may be temporarily programmed in or migrated to the multi-level cell region depending on the size of the remaining region (e.g., remaining storage space of the single level cell region) at a point in time when the data are to be programmed or at a point in time when the migration event occurs. Subsequently, the storage device may return the data with the high importance to the single level cell region and may first return the data of the high importance to the single level cell region before data with low importance. Accordingly, the storage device may secure the reliability of data and a latency of data by managing pieces of data such that data with high importance are kept in the single level cell region as much as possible and data with low importance are kept in the multi-level cell region, and may efficiently store and manage pieces of data in consideration of safety level information according to purposes and functions of one or more host devices in a vehicle system.

Figure 2:
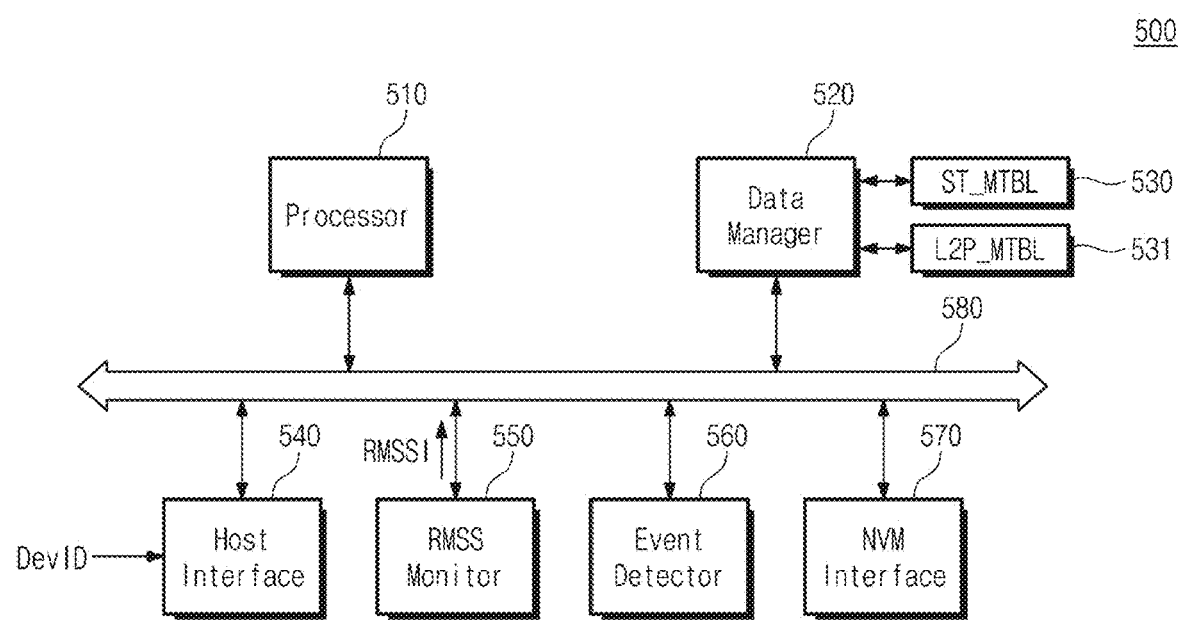
FIG. 2 is a block diagram illustrating an example of a storage controller according to some implementations.

FIG. 2 is a block diagram illustrating an example of a storage controller. For example, a storage controller 500 of FIG. 2 may correspond to the storage controller 310 of FIG. 1.

The storage controller 500 may include a processor 510, a data manager 520, a safety level-target storage region table 530, a mapping table 531, a host interface 540, a remaining storage region (RMSS) monitor 550, an event detector 560, a non-volatile memory (NVM) interface 570, and a bus 580.

The processor 510 may overall control the components 520, 530, 531, 540, 550, 560, 570, and 580 of the storage controller 500. The bus 580 may provide communication between the components 520, 530, 531, 540, 550, 560, 570, and 580.

The data manager 520 may perform programming of data received from a host device (e.g., 100 of FIG. 1), the migration of the programmed data, or the return of the migrated data based on the safety level-target storage region table 530 or the mapping table 531. For example, the data manager 520 may receive a program request and an address for the program request from the host device through the host interface 540, may receive remaining storage region information RMSSI from the remaining storage region monitor 550, and may receive signals providing notification that an occurrence of a migration event is detected or the occurrence of the return event is detected from the event detector 560. The data manager 520 may determine a storage region of a non-volatile memory, in which data corresponding to the program request are to be programmed, based on the safety level-target storage region table 530, and may provide a program command and an address for programming the data to the non-volatile memory (e.g., 350 of FIG. 1) through the non-volatile memory interface 570. The data manager 520 may determine storage regions of the non-volatile memory, to which data targeted for the migration or return are to be migrated or returned, based on the mapping table 531, and may provide a migration or return command and addresses for the migration or return of the data to the non-volatile memory through the non-volatile memory interface 570.

The remaining storage region monitor 550 may calculate a size of a remaining region of a single level cell region included in the non-volatile memory to generate the remaining storage region information RMSSI. For example, the remaining storage region monitor 550 may calculate the size of the remaining region by monitoring the number of free blocks, the number of used blocks, and the total number of blocks in real time for each storage region of the non-volatile memory, based on the mapping table 531.

The event detector 560 may detect the occurrence of the migration event or the occurrence of the return event. In some implementations, when a garbage collection operation for securing free blocks in the non-volatile memory or a read reclaim operation for improving the reliability of data stored in the non-volatile memory is performed, the event detector 560 may detect that the migration event occurs. As another example, when the storage device enters an idle period, the event detector 560 may detect that the return event occurs. However, the scope of the present disclosure is not limited thereto.

FIG. 3 is a diagram illustrating an example of a safety level-target storage region table, for example, the safety level-target storage region tables 315, 530 of FIGS. 1 and 2.

In FIG. 3, the safety level-target storage region table ST_MTBL may include types of a device ID DevID, types of the safety level information SFTLI, types of the remaining storage region information RMSSI, and types of a target storage region.

Referring to FIG. 3, in the safety level-target storage region table ST_MTBL, the device ID DevID may indicate types (or identifiers/a list) of host devices sharing a storage device (e.g., 300 of FIG. 1), and the safety level information SFTLI may indicate types (e.g., levels) of importance of data from each of the host devices identified by the device ID DevID. The remaining storage region information RMSSI may indicate types of the size of the remaining region of the single level cell region SLCR included in a non-volatile memory (e.g., 350 of FIG. 1), and the target storage region may indicate types of a storage region of the non-volatile memory, in which data from each of the host devices are to be programmed depending on the types of each of the device ID DevID, the safety level information SFTLI, and the remaining storage region information RMSSI.

In some implementations, in the safety level-target storage region table ST_MTBL, the types of the safety level information SFTLI may include levels LEV1 and LEV2. The level LEV1 may indicate that the importance of data is relatively high, and the level LEV2 may indicate that the importance of data is relatively low. In the safety level-target storage region table ST_MTBL, the types of the remaining storage region information RMSSI may include states ST1 and ST2. The state ST1 may indicate that the size of the remaining region of the single level cell region SLCR of the non-volatile memory is sufficient, and the state ST2 may indicate that the size of the remaining region of the single level cell region SLCR of the non-volatile memory is insufficient.

For example, when a device ID of a host device is "DEV1", in the safety level-target storage region table ST_MTBL, the type of the safety level information SFTLI may be set to "LEV1". When the remaining storage region information RMSSI from a remaining storage region monitor (e.g., 550 of FIG. 2) indicates the state ST1, the type of the target storage region may be set to the single level cell region SLCR such that data from the host device whose device ID is "DEV1" are programmed in the single level cell region SLCR. When the remaining storage region information RMSSI from the remaining storage region monitor indicates the state ST2, the type of the target storage region may be set to a multi-level cell region MLCR such that data from a host device whose device ID is "DEV1" are programmed in the multi-level cell region MLCR.

For example, when a device ID of a host device is "DEV2", in the safety level-target storage region table ST_MTBL, the type of the safety level information SFTLI may be in the state of being set to "LEV2". In this case, as the type of the target storage region is set to the multi-level cell region MLCR, regardless of whether the remaining storage region information RMSSI from the remaining storage region monitor indicates ST1 or ST2, data from the host device whose device ID is "DEV2" may be stored in the multi-level cell region MLCR.

In some implementations, when the safety level information SFTLI associated with the host device whose device ID is "DEV1" indicates a first level (e.g., LEV1), a type of a storage region where data from the host device whose device ID is "DEV1" are to be programmed may change depending on a state which the remaining storage region information RMSSI indicates (530-1). For example, when the remaining storage region information RMSSI indicates a first state (e.g., ST1), a storage region where data from the host device are to be programmed may be the single level cell region SLCR. And, when the remaining storage region information RMSSI indicates a second state (e.g., ST2), a storage region where data from the host device are to be programmed may be the multi-level cell region MLCR.

In some implementations, when the safety level information SFTLI associated with the host device whose device ID is "DEV2" indicates a second level (e.g., LEV2), a type of a storage region where data from the host device whose device ID is "DEV2" are to be programmed may not change regardless of a state which the remaining storage region information RMSSI indicates (530-2). For example, even though the remaining storage region information RMSSI indicates one of the first and second states ST1 or ST2, a storage region where data from the host device are to be programmed may be the multi-level cell region MLCR.

FIG. 4 is a flowchart illustrating an operating method of a storage device according to some implementations of the present disclosure. The process of FIG. 4 can be applied to any of the storage devices described herein.

Referring to FIG. 4, in an operating method of a storage device, the storage device may receive a data program request from a host device (S100).

The storage device may program data from the host device in a first storage region of a non-volatile memory, based on safety level information (e.g., SFTLI of FIG. 3) of the host device and remaining storage region information (e.g., RMSSI of FIG. 3) of the non-volatile memory (S300).

In some implementations, the programming of the data may be performed based on a safety level-target storage region table (e.g., ST_MTBL of FIG. 3).

In some implementations, the first storage region may be a single level cell region or may be a multi-level cell region.

Based on the safety level information and the remaining storage region information, the storage device may migrate the data programmed in the first storage region to a second storage region or may return the data migrated to the second storage region to the first storage region (S500).

In some implementations, the migration of the programmed data or the return of the migrated data may be performed based on a mapping table (e.g., 317 of FIG. 1 or 531 of FIG. 2). The mapping table will be described with reference to FIG. 5C.

In some implementations, when the first storage region is one of the single level cell region and the multi-level cell region, the migration to the one of the single level cell region and the multi-level cell region may be performed.

In some implementations, the return of the migrated data may be performed in the case where the migration to the multi-level cell region is performed. For example, when the migration to the single level cell region is performed, the return of the migrated data may not be performed. When the migration to the multi-level cell region is performed, the return of the migrated data from the multi-level cell region to the single level cell region may be performed.

In some implementations, operation S100, operation S300, and operation S500 may be performed by a storage controller (e.g., 310 of FIG. 1 or 500 of FIG. 2) included in the storage device.

Figure 5A:
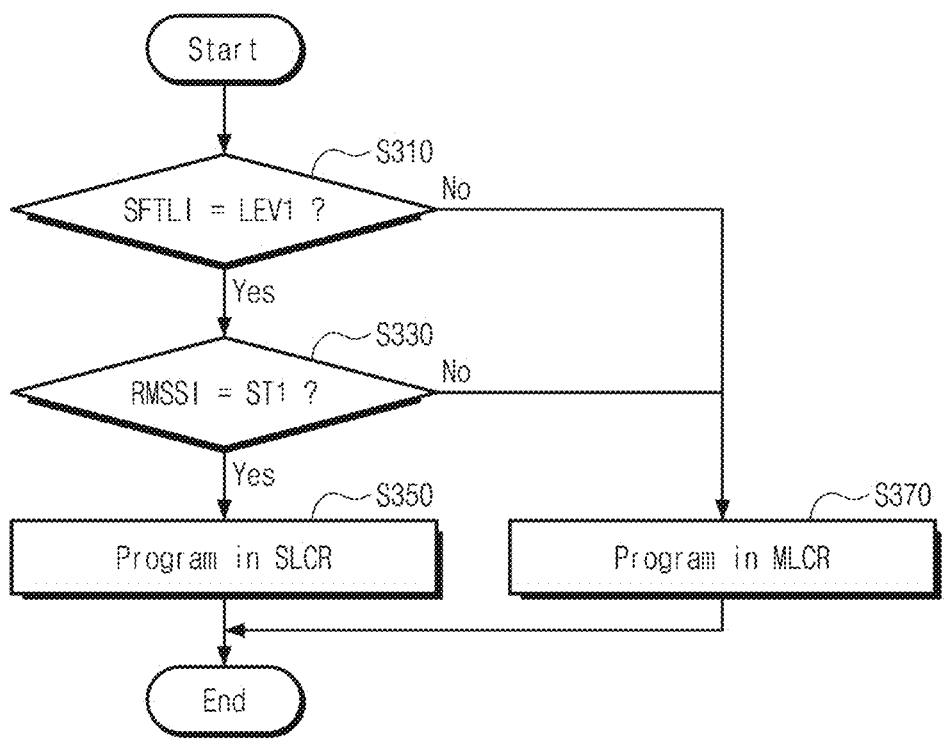
FIG. 5A is a flowchart illustrating an example of programming data from a host device in a first storage region of a storage device.
Figure 5B:
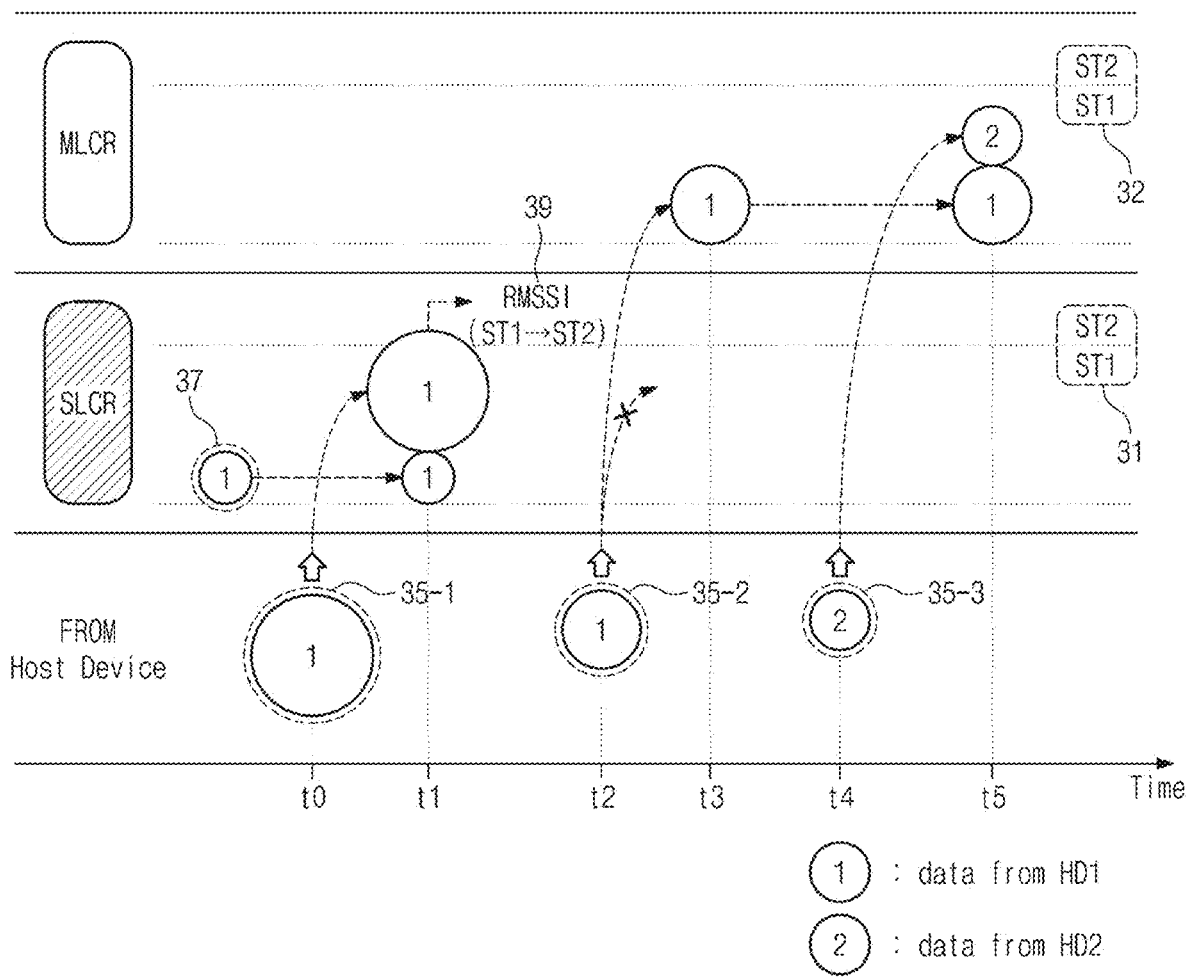
FIG. 5B is a diagram illustrating operations associated with programming data.

FIG. 5A is a flowchart illustrating an example of an operation of programming data from a host device of (e.g., the host device of FIG. 4) in a first storage region of a storage device. FIG. 5B is a diagram illustrating operations associated with FIG. 5A in detail. FIG. 5C is a diagram describing a mapping table (e.g., the mapping table of FIG. 2) according to operations of FIG. 5A.

In FIG. 5A, a storage controller may perform operation S310, operation S330, operation S350, and operation S370 illustrated in FIG. 5A based on a safety level-target storage region table (e.g., ST_MTBL of FIG. 3). For example, the storage controller may identify a device ID of a host device, which transmits a program request, from the safety level-target storage region table and may retrieve a type of the safety level information SFTLI associated with a host device corresponding to the device ID, a type of the remaining storage region information RMSSI, and a type of the target storage region.

Referring to FIG. 5A, based on the safety level-target storage region table, the storage controller may determine whether the safety level information SFTLI associated with the host device is a first level (e.g., LEV1) (S310).

In some implementations, the first level may mean that the importance of data from the host device is relatively high.

When the safety level information SFTLI indicates the first level (Yes in operation S310), the storage controller may determine whether the remaining storage region information RMSSI indicates a first state (e.g., ST1) (S330).

In some implementations, the remaining storage region information RMSSI may be received from a remaining storage region monitor (e.g., 550 of FIG. 2), and the first state may indicate that the size of the remaining region of the single level cell region SLCR is sufficient for storage of the program request.

When the remaining storage region information RMSSI indicates the first state (Yes in operation S330), the storage controller may program data from the host device in the single level cell region SLCR of a non-volatile memory (S350).

In some implementations, the storage controller may search the safety level-target storage region table for a type of the target storage region and may program the data from the host device in the single level cell region SLCR.

When the safety level information SFTLI does not indicate the first level (No in operation S310) or when the remaining storage region information RMSSI does not indicate the first state (No in operation S330), the storage controller may program the data from the host device in the multi-level cell region MLCR of the non-volatile memory (S370).

In some implementations, operation S350 may mean programming data with high importance in the single level cell region SLCR when the size of the remaining region of the single level cell region SLCR is sufficient. Operation S370 may mean programming data in the multi-level cell region MLCR when the size of the remaining region of the single level cell region SLCR is not sufficient, regardless of whether the importance of the data is high or low.

Referring to FIG. 5B, the single level cell region SLCR and the multi-level cell region MLCR of the non-volatile memory are illustrated, and pieces of data (e.g., 35-1, 35-2, and 35-3) from various host devices may be programmed in the non-volatile memory at points in time (e.g., t0, t2, and t4). For example, each of the pieces of data 35-1 and 35-2 may be data from a first host device HD1, and the data 35-3 may be data from a second host device HD2. The first host device HD1 may have a specific device ID (e.g., DEV1 of FIG. 3), and the second host device HD2 may have a device ID (e.g., DEV2 of FIG. 3) different from that of the first host device HD1. The safety level information SFTLI associated with the first host device HD1 may indicate a first level (e.g., LEV1 of FIG. 3), and the safety level information SFTLI associated with the second host device HD2 may indicate a second level (e.g., LEV2 of FIG. 3).

A state 31 may indicate the size of the remaining region of the single level cell region SLCR, a state 32 may indicate the size of the remaining region of the multi-level cell region MLCR, and the state 31 may be indicated by remaining storage region information (e.g., RMSSI of FIGS. 1 and 2).

Before the point in time t0, data 37 from the first host device HD1 may be in a state of being stored in the single level cell region SLCR.

At the point in time t0, data 35-1 from the first host device HD1 may be received by a storage device, the storage controller may determine whether the safety level information SFTLI associated with the first host device HD1 indicates the first level and may determine whether the remaining storage region information RMSSI indicates a first state (e.g., ST1 of FIG. 3) (S310 and S330). Because the safety level information SFTLI associated with the first host device HD1 indicates the first level and the remaining storage region information RMSSI indicates the first state at the point in time t0, the storage controller may program the data 35-1 from the first host device HD1 in the single level cell region SLCR of the non-volatile memory at the point in time t1.

Data 35-2 from the first host device HD1 may be received by the storage device at the point in time t2, and the storage controller may determine a level indicated by the safety level information SFTLI and a state indicated by the remaining storage region information RMSSI in the same manner as the data 35-1. Because the remaining storage region information RMSSI indicates a second state (e.g., ST2 of FIG. 3) at the point in time t2 (e.g., because the remaining storage region information RMSSI changes from the first state to the second state at the point in time t1 (39) because of the storage of the data 35-1), the storage controller may fail to program the data 35-2 from the first host device HD1 in the single level cell region SLCR of the non-volatile memory at a point in time t3 and may program the data 35-2 in the multi-level cell region MLCR even though the safety level information SFTLI associated with the first host device HD1 indicates the first level.

Data 35-3 from the second host device HD2 may be received by the storage device at the point in time t4, and the storage controller may determine whether the safety level information SFTLI associated with the second host device HD2 indicates the first level (S310). Because the safety level information SFTLI associated with the second host device HD2 indicates the second level, the storage controller may program the data 35-3 from the second host device HD2 in the multi-level cell region MLCR of the non-volatile memory at a point in time t5.

Referring to FIG. 5C, the mapping table L2P_MTBL may indicate storage regions ASR in which the data 35-1, 35-2, and 35-3 received from the first host device HD1 and the second host device HD2 of FIG. 5B are actually stored.

For example, the data 35-1 from the first host device HD1 may be programmed in the single level cell region SLCR; in the mapping table L2P_MTBL, the storage region ASR where the data 35-1 are actually stored may be indicated as the single level cell region SLCR together with logical addresses LPN11, LPN12, LPN13, . . . , LPN1m (m being an integer of 4 or more) and physical addresses PPN11, PPN12, PPN13, . . . , PPN1m corresponding to the data 35-1. In the mapping table L2P_MTBL, the safety level information SFTLI may be indicated as the first level together with the storage region ASR; the data 35-1 may be managed as physical blocks PBN11, . . . . PBN1n (n being an integer of 2 or more), and the migration or return for the data 35-1 may be performed later.

For example, the data 35-2 from the first host device HD1 may be programmed in the multi-level cell region MLCR; in the mapping table L2P_MTBL, the storage region ASR where the data 35-2 are actually stored may be indicated as the multi-level cell region MLCR together with logical addresses LPN21, LPN22, LPN23, . . . , LPN2p (p being an integer of 4 or more) and physical addresses PPN21, PPN22, PPN23, . . . , PPN2p corresponding to the data 35-2. In the mapping table L2P_MTBL, the safety level information SFTLI may be indicated as the first level together with the storage region ASR; the data 35-2 may be managed as physical blocks PBN21, . . . , PBN2q (q being an integer of 2 or more), and the migration or return for the data 35-2 may be performed later.

For example, the data 35-3 from the second host device HD2 may be programmed in the multi-level cell region MLCR; in the mapping table L2P_MTBL, the storage region ASR where the data 35-3 are actually stored may be indicated as the multi-level cell region MLCR together with logical addresses LPN31, LPN32, LPN33, . . . , LPN3r (r being an integer of 4 or more) and physical addresses PPN31, PPN32, PPN33, . . . , PPN3r corresponding to the data 35-3. In the mapping table L2P_MTBL, the safety level information SFTLI may be indicated as the second level together with the storage region ASR; the data 35-3 may be managed as physical blocks PBN31, . . . , PBN3s (s being an integer of 2 or more), and the migration or return for the data 35-3 may be performed later.

Figure 6B:
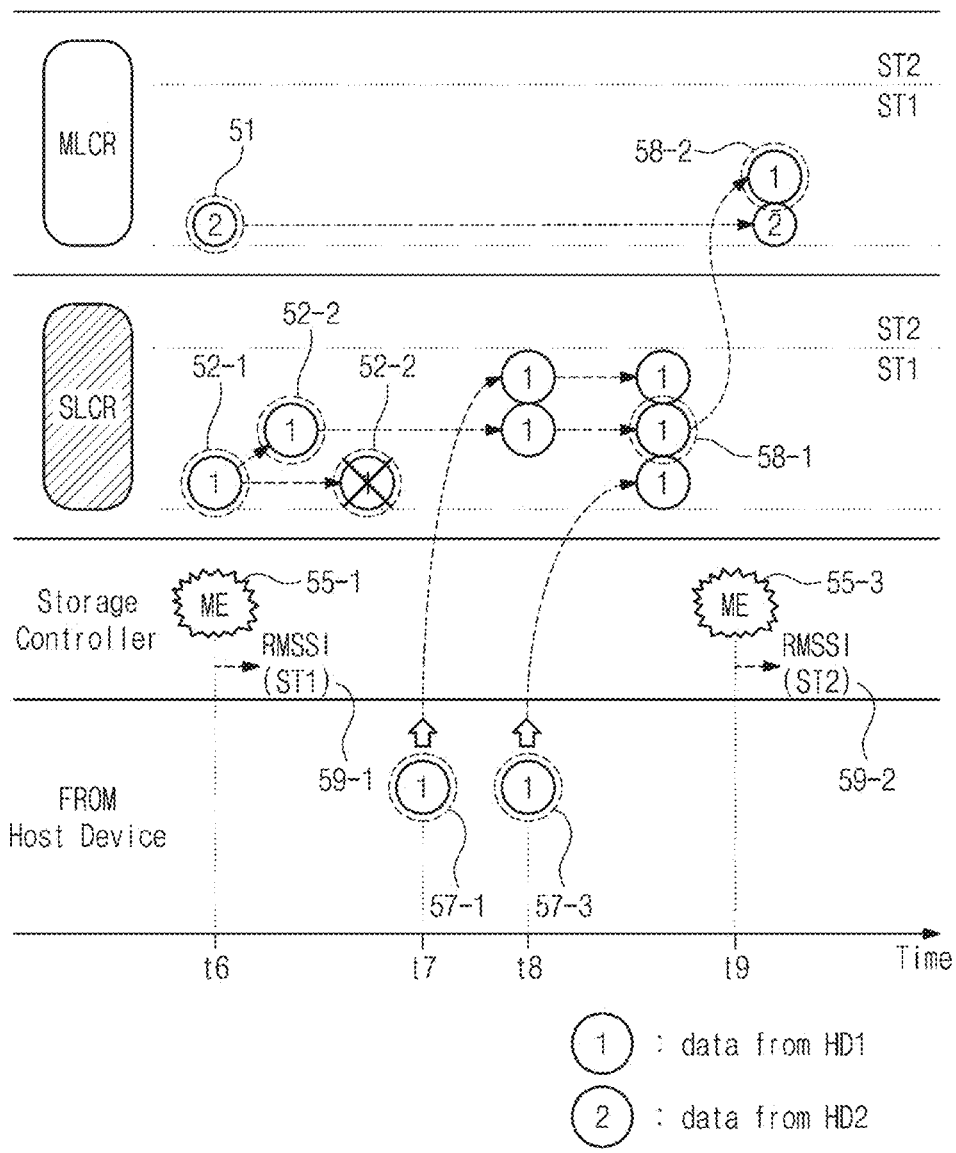
FIG. 6B is a diagram illustrating operations associated with migrating data.

FIG. 6A is a flowchart illustrating an example of an operation of migrating data programmed in a first storage region (e.g., the data of FIG. 4) to a second storage region of a storage device. FIG. 6B is a diagram illustrating operations associated with FIG. 6A.

In FIG. 6A, a storage controller may perform some of operations illustrated in FIG. 6A, that is, operation S520, operation S521, operation S523, operation S525, operation S527, operation S533, operation S535, operation S537, and operation S541, based on a mapping table (e.g., L2P_MTBL of FIG. 5C). For example, the storage controller may search the mapping table for a type of the safety level information SFTLI and a type of the storage region ASR with regard to specific physical blocks.

Referring to FIG. 6A, the storage controller may monitor the occurrence of a migration event ME (S510) and may determine whether the migration event ME occurs (S511). When the migration event ME does not occur (No in operation S511), the storage controller may continue to perform the monitoring until the migration event ME occurs (S510).

When the migration event ME occurs (Yes in operation S511), the storage controller may determine whether the safety level information SFTLI associated with the specific physical blocks indicates a first level (e.g., LEV1) (S520).

In some implementations, the first level may mean that the importance of data stored in the specific physical blocks is relatively high.

When the safety level information SFTLI indicates the first level (Yes in operation S520), the storage controller may determine whether the storage region ASR is the single level cell region SLCR (S521).

When the storage region ASR indicates the single level cell region SLCR (Yes in operation S521), the storage controller may determine whether the remaining storage region information RMSSI indicates a first state (e.g., ST1) (S523).

In some implementations, the remaining storage region information RMSSI may be received from a remaining storage region monitor (e.g., 550 of FIG. 2), and the first state of the remaining storage region information RMSSI may indicate that the size of the remaining region of the single level cell region SLCR is sufficient.

In some implementations, the storage controller may perform determination in operation S523 based on a point in time when the migration event ME occurs.

When the remaining storage region information RMSSI indicates the first state (Yes in operation S523), the storage controller may migrate data stored in the single level cell region SLCR to any other memory block of the single level cell region SLCR (S525).

When the safety level information SFTLI does not indicate the first level (No in operation S520), the storage controller may migrate data stored in the single level cell region SLCR to the multi-level cell region MLCR (S541).

When the storage region ASR is not the single level cell region SLCR (No in operation S521), the storage controller may determine whether the remaining storage region information RMSSI indicates the first state (S533).

When the remaining storage region information RMSSI indicates the first state (Yes in operation S533), the storage controller may migrate data stored in the multi-level cell region MLCR to the single level cell region SLCR (S535).

When the remaining storage region information RMSSI does not indicate the first state (No in operation S533), the storage controller may migrate data stored in the multi-level cell region MLCR to any other memory block of the multi-level cell region MLCR (S537).

In some implementations, the case where the remaining storage region information RMSSI does not indicate the first state may mean the case where the remaining storage region information RMSSI indicates a second state (e.g., ST2). The second state of the remaining storage region information RMSSI may indicate that the size of the remaining region of the single level cell region SLCR is insufficient.

When the remaining storage region information RMSSI does not indicate the first state (No in operation S523), the storage controller may migrate data stored in the single level cell region SLCR to the multi-level cell region MLCR (S527).

In some implementations, operation S510 and operation S511 may be performed by the event detector 560 of FIG. 2.

In some implementations, enhanced data protection policies may be applied to the data migrated to the multi-level cell region MLCR (or any other memory block of the multi-level cell region MLCR) in operation S527 or operation S537 (S529 or S539). For example, the data protection policies may include a read reclaim operation, an error correction code (ECC) operation, a redundancy repair operation, etc., but the scope of the present disclosure is not limited thereto. The read reclaim operation may mean an operation of changing a storage region of data. The ECC operation may mean an operation of detecting and correcting an error of data based on parity bits. The redundancy repair operation may mean an operation of replacing defective memory cells with normal redundancy memory cells. For example, the data to which the enhanced data protection policy is applied may mean data which have to be programmed in the single level cell region SLCR or have to be managed in the single level cell region SLCR in principle because the safety level information SFTLI indicates the first level.

Referring to FIG. 6B, the single level cell region SLCR and the multi-level cell region MLCR of the non-volatile memory are illustrated, the migration events ME may occur at points in time (e.g., t6 and t9), and pieces of data (e.g., 57-1 and 57-3) from a host device may be programmed in the non-volatile memory at points in time (e.g., t7 and t8). For example, each of the pieces of data 57-1 and 57-3 may be data from the first host device HD1. Before the point in time t6, data 52-1 from the first host device HD1 may be in a state of being stored in the single level cell region SLCR, and data 51 may be in a state of being stored in the multi-level cell region MLCR. The first host device HD1, the second host device HD2, and the safety level information SFTLI associated with each of the first and second host devices HD1 and HD2 are the same as those described with reference to FIG. 5B.

When a migration event 55-1 occurs at the point in time t6, a storage controller may determine whether the safety level information SFTLI associated with specific physical blocks indicates the first level (S520), may determine whether the storage region ASR is the single level cell region SLCR (S521), and may determine whether the remaining storage region information RMSSI indicates the first state (S523).

With regard to the data 52-1 stored in specific physical blocks, because the safety level information SFTLI indicates the first level, the storage region ASR is the single level cell region SLCR, and the remaining storage region information RMSSI indicates the first state (59-1), the storage controller may migrate the data 52-1 to any other memory block of the single level cell region SLCR (e.g., 52-2). After the migration is completed, the data 52-1 may be updated as invalid data and may be erased (e.g., 52-2).

Pieces of data 57-1 and 57-3 from the first host device HD1 may be received by the storage device at points in time t7 and t8, and the storage controller may program the pieces of data 57-1 and 57-3 in the single level cell region SLCR through operation S310 and operation S330.

When a migration event 55-3 occurs at the point in time t9, as in the above case where the migration event 55-1 occurs at the point in time t6, the storage controller may perform determination in operation S520, operation 521, and operation S523. With regard to data 58-1 stored in specific physical blocks, because the safety level information SFTLI indicates the first level, the storage region ASR is the single level cell region SLCR, and the remaining storage region information RMSSI indicates the second state (59-2) (e.g., indicating that the single level cell region SLCR is full or otherwise insufficient for storage of further data), the storage controller may migrate the data 58-1 to the multi-level cell region MLCR (e.g., 58-2).

Figure 7A:
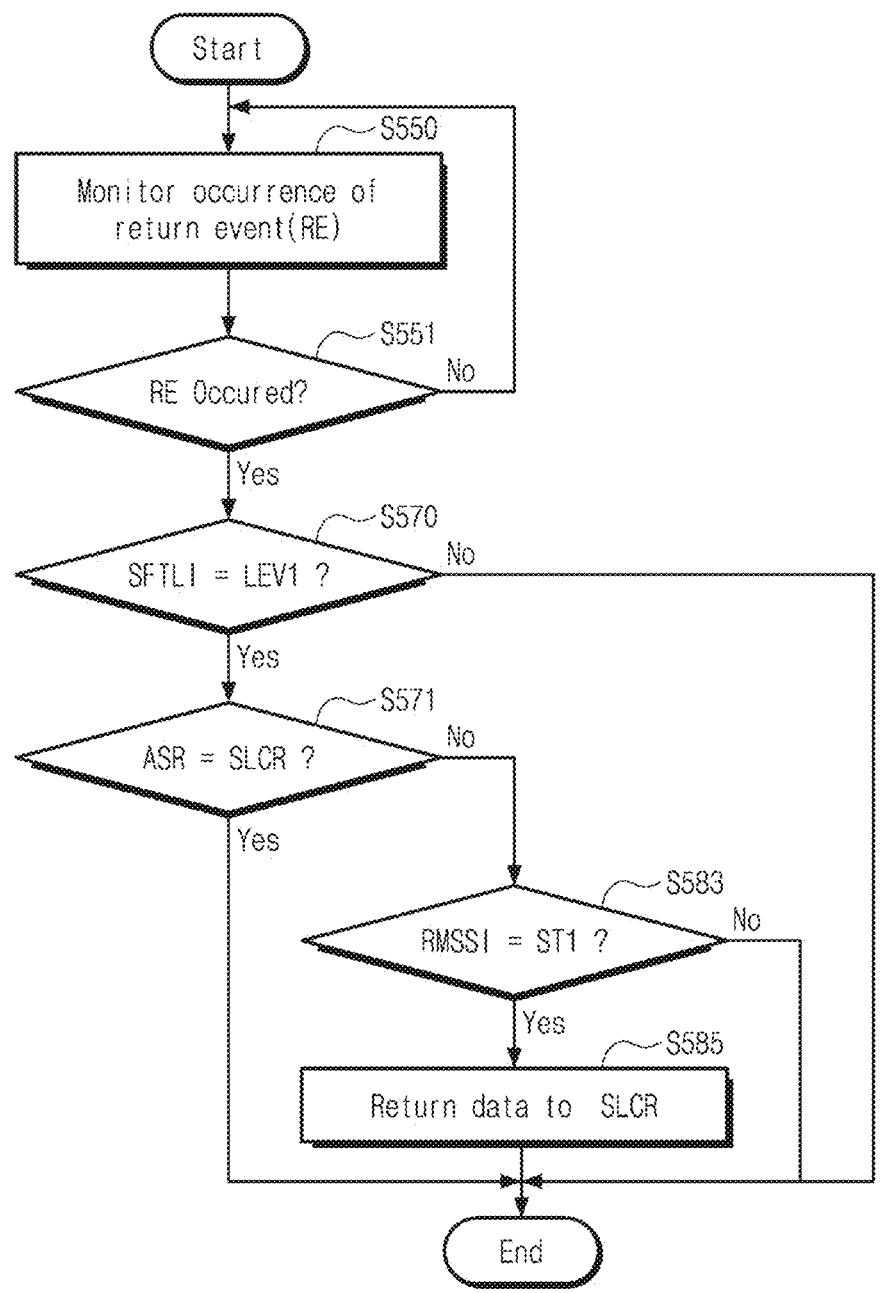
FIG. 7A is a flowchart illustrating an example of returning data migrated to a second storage region of to a first storage region.
Figure 7B:
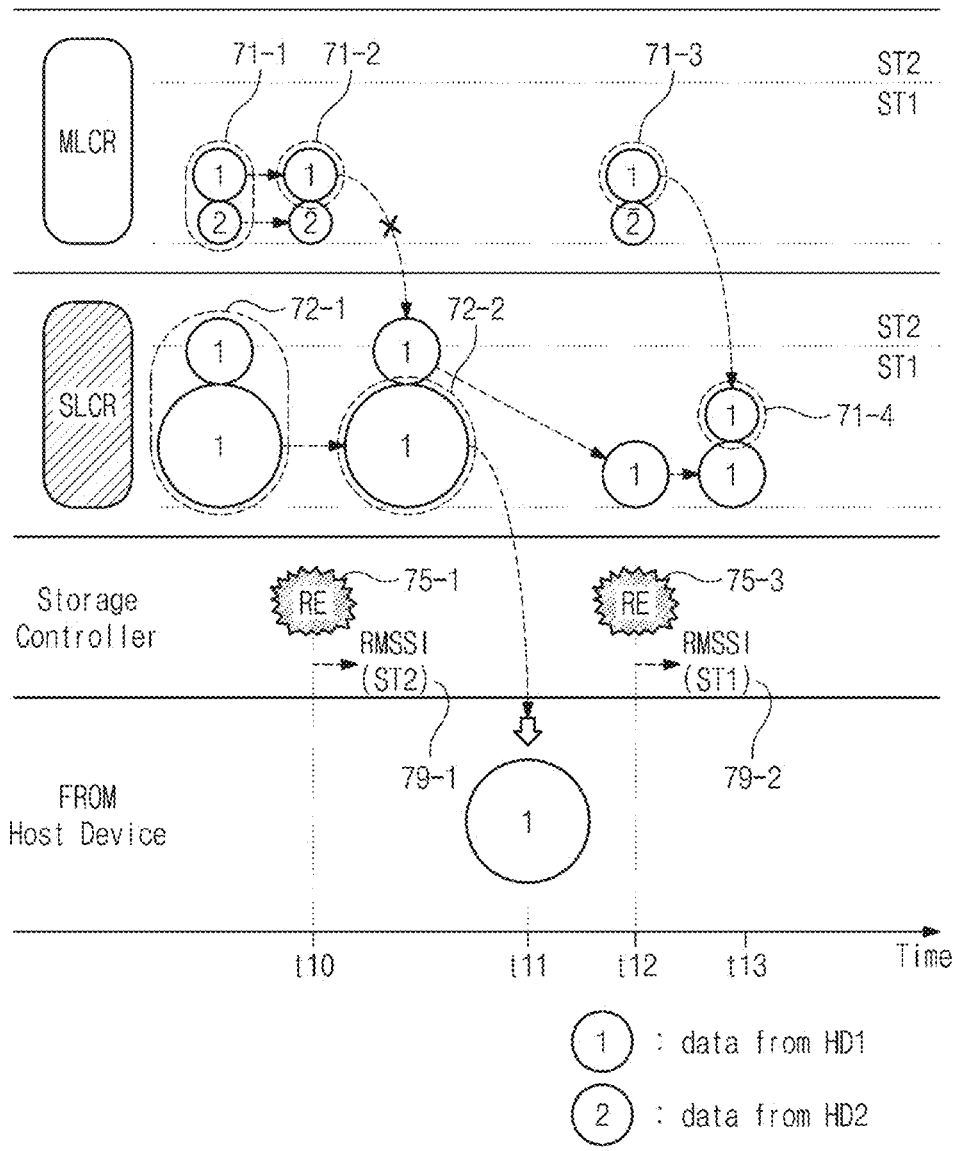
FIG. 7B is a diagram illustrating operations associated with migrating data.

FIG. 7A is a flowchart illustrating an example of an operation of returning data migrated or stored to a second storage region (e.g., the data of FIG. 4) to a first storage region. FIG. 7B is a diagram illustrating operations associated with FIG. 7A.

In FIG. 7A, a storage controller may perform some of operations illustrated in FIG. 7A, that is, operation S570, operation S571, operation S583, and operation S585, based on a mapping table (e.g., L2P_MTBL of FIG. 5C).

Referring to FIG. 7A, the storage controller may monitor the occurrence of a return event RE (S550) and may determine whether the return event RE occurs (S551). When the return event RE does not occur (No in operation S551), the storage controller may continue to perform the monitoring until the return event RE occurs (S550).

When the return event RE occurs (Yes in operation S551), the storage controller may determine whether the safety level information SFTLI associated with specific physical blocks indicates a first level (e.g., LEV1) (S570).

In some implementations, the first level may mean that the importance of data stored in the specific physical blocks is relatively high.

When the safety level information SFTLI indicates the first level (Yes in operation S570), the storage controller may determine whether the storage region ASR is the single level cell region SLCR (S571).

When the storage region ASR is not the single level cell region SLCR (No in operation S571), the storage controller may determine whether the remaining storage region information RMSSI indicates a first state (e.g., ST1) (S583).

In some implementations, the first state of the remaining storage region information RMSSI may indicate that the size of the remaining region of the single level cell region SLCR is sufficient.

In an embodiment, the storage controller may perform determination in operation S583 based on a point in time when the return event RE occurs.

When the remaining storage region information RMSSI indicates the first state (Yes in operation S583) (e.g., indicating that the single level cell region SLCR has sufficient space to receive the data), the storage controller may return data not stored in the single level cell region SLCR to the single level cell region SLCR (S585).

When the safety level information SFTLI does not indicate the first level (No in operation S570), when the storage region ASR is the single level cell region SLCR (Yes in operation S571), or when the remaining storage region information RMSSI does not indicate the first state (No in operation S583), the storage controller may end the process without performing the return of data.

In some implementations, operation S550 and operation S551 may be performed by the event detector 560 of FIG. 2.

Referring to FIG. 7B, the single level cell region SLCR and the multi-level cell region MLCR of the non-volatile memory are illustrated, the return events REs may occur at points in time (e.g., t10 and t12), and, at a point in time t11, data from the first host device HD1 may be read from the non-volatile memory to the first host device HD1 and may be erased in the non-volatile memory. Before the point in time t10, pieces of data 71-1 from the first host device HD1 and the second host device HD2 may be in a state of being stored in the multi-level cell region MLCR, and pieces of data 72-1 from the first host device HD1 and the second host device HD2 may be in a state of being stored in the single level cell region SLCR. The first host device HD1, the second host device HD2, and the safety level information SFTLI associated with each of the first and second host devices HD1 and HD2 are the same as those described with reference to FIG. 5B.

When a return event 75-1 occurs at the point in time t10, a storage controller may determine whether the safety level information SFTLI associated with specific physical blocks indicates the first level (S570), may determine whether the storage region ASR is the single level cell region SLCR (S571), and may determine whether the remaining storage region information RMSSI indicates the first state (S583).

With regard to data 71-2 stored in specific physical blocks, even though the safety level information SFTLI indicates the first level, because the storage region ASR is not the single level cell region SLCR and the remaining storage region information RMSSI does not indicate the first state (79-1), the storage controller may not return the data 71-2 to the single level cell region SLCR.

At a point in time t11, data from the first host device HD1 may be read from the non-volatile memory to the first host device HD1 and may be erased; in this case, after the point in time t11, the remaining storage region information RMSSI may indicate the first state.

With regard to data 71-3 stored in specific physical blocks, because the safety level information SFTLI indicates the first level, the storage region ASR is not the single level cell region SLCR, and the remaining storage region information RMSSI indicates the first state (79-2), at a point in time t13, the storage controller may return the data 71-3 to the single level cell region SLCR (e.g., 71-4).

Figure 8:
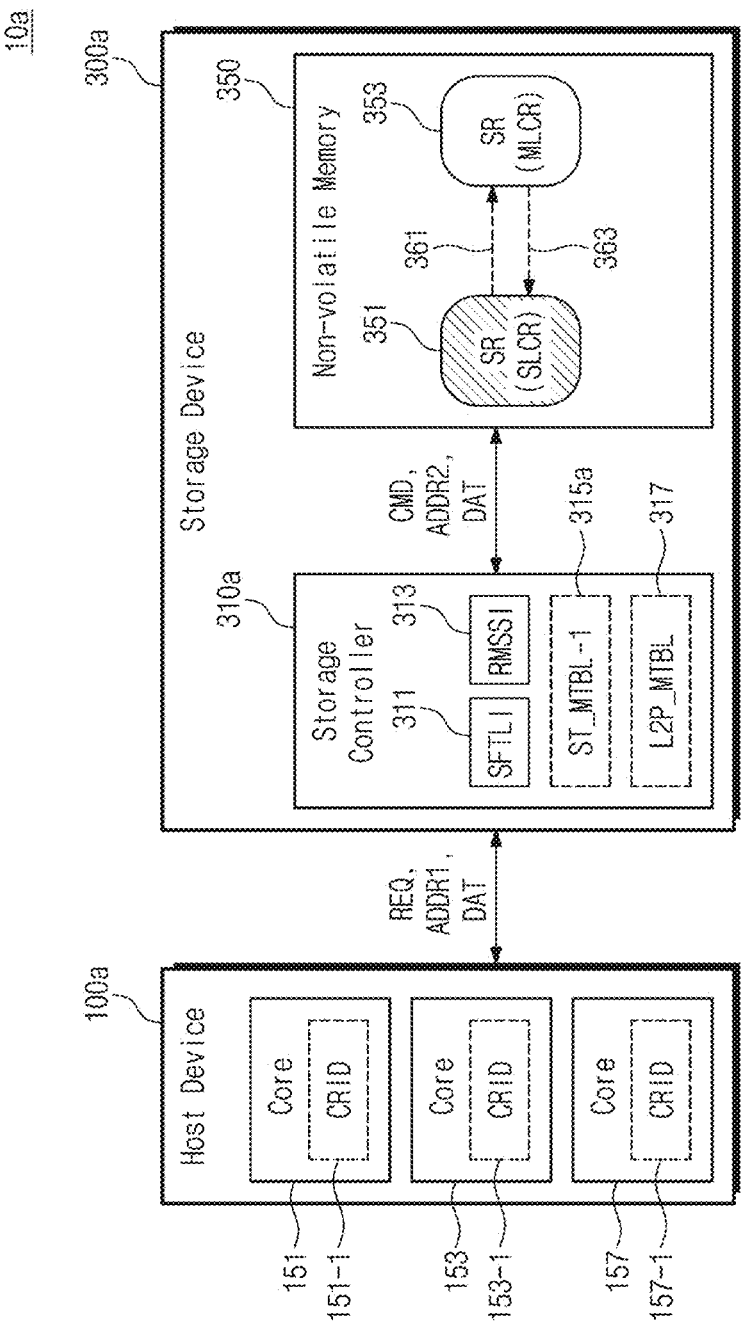
FIG. 8 is a block diagram illustrating an example of an electronic system including a storage device according to some implementations.

FIG. 8 is a block diagram illustrating an electronic system including a storage device according to some implementations of the present disclosure.

Referring to FIG. 8, an electronic system 10a may include a host device 100a and a storage device 300a. Comparing the electronic system 10a with the electronic system 10 of FIG. 1, the host device 100a may further include a plurality of cores 151, 153, and 157 unlike the host device 100, the plurality of cores 151, 153, and 157 may respectively have core IDs 151-1, 153-1, and 157-1, and a storage controller 310a may include a safety level-target storage region table (ST_MTBL-1) 315a modified depending on importance of pieces of data from the plurality of cores 151, 153, and 157.

In some implementations, the safety level-target storage region table 315a may in advance define types of the plurality of cores 151, 153, and 157, types of importance of data from each of the plurality of cores 151, 153, and 157, types of the size of the remaining region, and types of the target storage region, and the mapping table 317 may indicate storage regions of the non-volatile memory 350, in which pieces of data received from the plurality of cores 151, 153, and 157 are actually stored. The storage controller 310a may perform the programming of the data DAT, the migration of the programmed data, or the return of the migrated data based on the safety level-target storage region table 315 or the mapping table (L2P_MTBL) 317. For example, the storage controller 310a may further receive the core IDs 151-1, 153-1, and 157-1 from the host device 100a and may use a variety of information defined with respect to the plurality of cores 151, 153, and 157 by identifying the data DAT from the plurality of cores 151, 153, and 157 in the safety level-target storage region table 315*a* and the mapping table 317 based on the core IDs 151-1, 153-1, and 157-1.

FIG. 9 is a diagram illustrating an example of a safety level-target storage region table of FIG. 8.

In FIG. 9, the safety level-target storage region table ST_MTBL-1 may include types of a core ID (e.g., identifiers of a core), types of the safety level information SFTLI, types of the remaining storage region information RMSSI, and types of the target storage region.

Referring to FIG. 9, in the safety level-target storage region table ST_MTBL-1, a core ID CRID may indicate types (or a list) of cores sharing a storage device (e.g., 300*a* of FIG. 8), and the safety level information SFTLI may indicate types of importance of data from each of cores identified by the core ID CRID. The remaining storage region information RMSSI may indicate types of the size of the remaining region of the single level cell region SLCR included in a non-volatile memory (e.g., 350 of FIG. 8), and the target storage region may indicate types of a storage region of the non-volatile memory, in which data from each of the cores are to be programmed for the first time depending on the types of each of the core ID CRID, the safety level information SFTLI, and the remaining storage region information RMSSI.

In some implementations, in the safety level-target storage region table ST_MTBL-1, the types of the safety level information SFTLI may include safety levels SFTL1, SFTL2, and SFTL3 and levels LEV1 and LEV2. The safety levels SFTL1, SFTL2, and SFTL3 may be defined by subdividing the levels LEV1 and LEV2. The safety level SFTL1 may indicate that importance of data is higher than that of the safety level SFTL2, and the safety level SFTL2 may indicate that importance of data is higher than that of the safety level SFTL3. The level LEV1 may indicate that importance of data is higher than that of the level LEV2. The safety level SFTL1 and the safety level SFTL2 may indicate the level LEV1, and the safety level SFTL3 may indicate the level LEV2 (e.g., the safety level SFTL1 and the safety level SFTL2 may correspond to the level LEV1, and the safety level SFTL3 may correspond to the level LEV2).

For example, in the safety level-target storage region table ST_MTBL-1, the type of the safety level information SFTL1 may be set to SFTL1 and LEI when a core ID of a core is "CR1" and may be set to SFTL2 and LEV1 when a core ID of a core is "CR2". When the remaining storage region information RMSSI from a remaining storage region monitor (e.g., 550 of FIG. 2) indicates the state ST1, the type of the target storage region may be set to the single level cell region SLCR such that data from a core whose core ID is one of CR1 and CR2 are programmed in the single level cell region SLCR. When the remaining storage region information RMSSI from the remaining storage region monitor indicates the state ST2, the type of the target storage region may be set to the multi-level cell region MLCR such that data from a core whose core ID is one of CR1 and CR2 are programmed in the multi-level cell region MLCR.

For example, when a core ID of a core is "CR3", in the safety level-target storage region table ST_MTBL-1, the type of the safety level information SFTLI may be in the state of being set to SFTL3 and LEV2. In this case, as the type of the target storage region is set to the multi-level cell region MLCR, regardless of whether the remaining storage region information RMSSI from the remaining storage region monitor indicates one the state ST1 or ST2, data from a core whose core ID is "CR3" may be stored in the multi-level cell region MLCR.

In some implementations, when the safety level information SFTLI associated with a first core whose core ID is "CR1" and a second core whose core ID is "CR2" includes a first safety level (e.g., SFTL1) and a second safety level (e.g., SFTL2) and each of the first safety level and the second safety level indicates a first level (e.g., LEV1), a storage region in which pieces of data from the first core and the second core are to be programmed may change depending on a state which the remaining storage region information RMSSI indicates (530-3). For example, when the remaining storage region information RMSSI indicates a first state (e.g., ST1), a storage region where data from the first core and the second core are to be programmed may be the single level cell region SLCR. When the remaining storage region information RMSSI indicates a second state (e.g., ST2), a storage region where data from the first core and the second core are to be programmed may be the multi-level cell region MLCR.

In some implementations, the safety level information SFTLI associated with a third core whose core ID is "CR3" may further include a third safety level (e.g., SFTL3). When the third safety level indicates a second level (e.g., LEV2), a type of a storage region where data from the third core are to be programmed may not change regardless of a state which the remaining storage region information RMSSI indicates (530-4). For example, when the remaining storage region information RMSSI indicates one of the first and second states, a storage region where data from the third core are to be programmed may be the multi-level cell region MLCR.

Figure 10A:
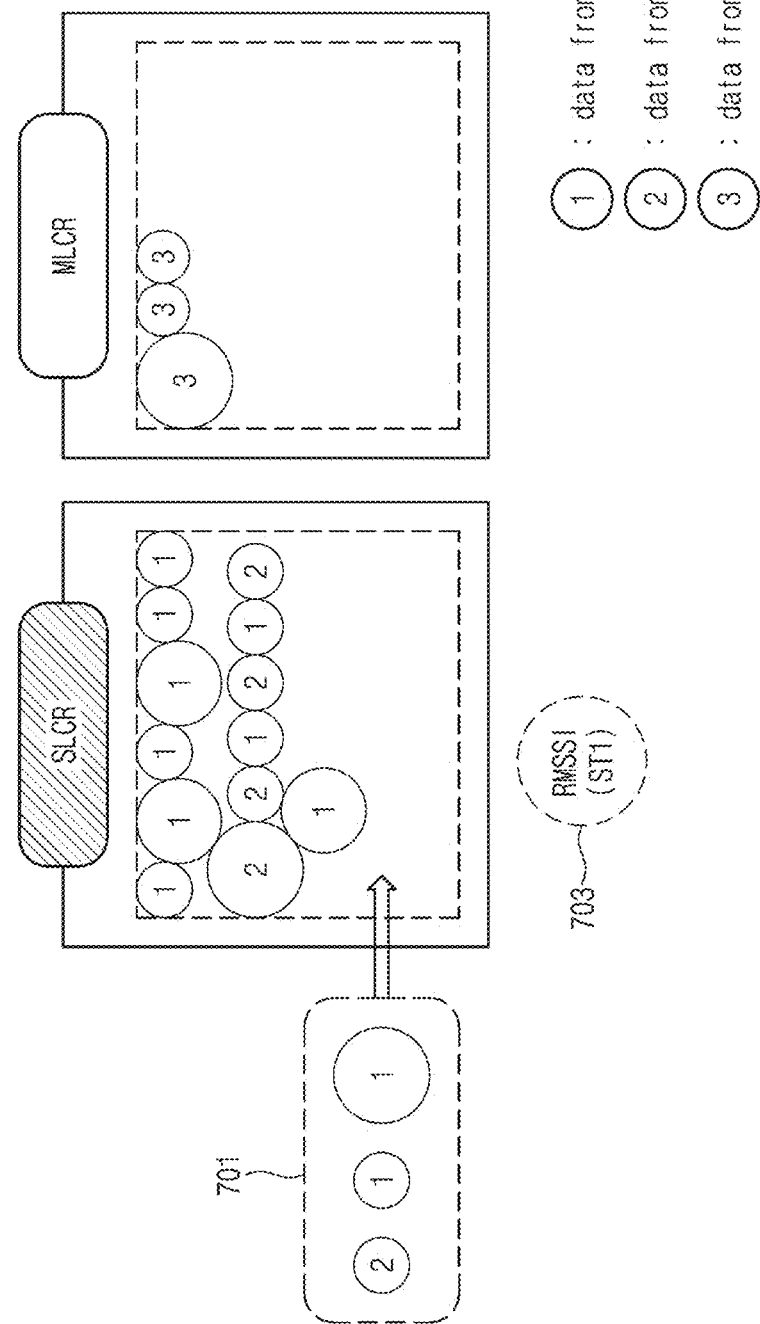
FIGS. 10A and 10B are diagrams illustrating an example of programming data from a host device in a first storage region of a storage device.
Figure 10B:
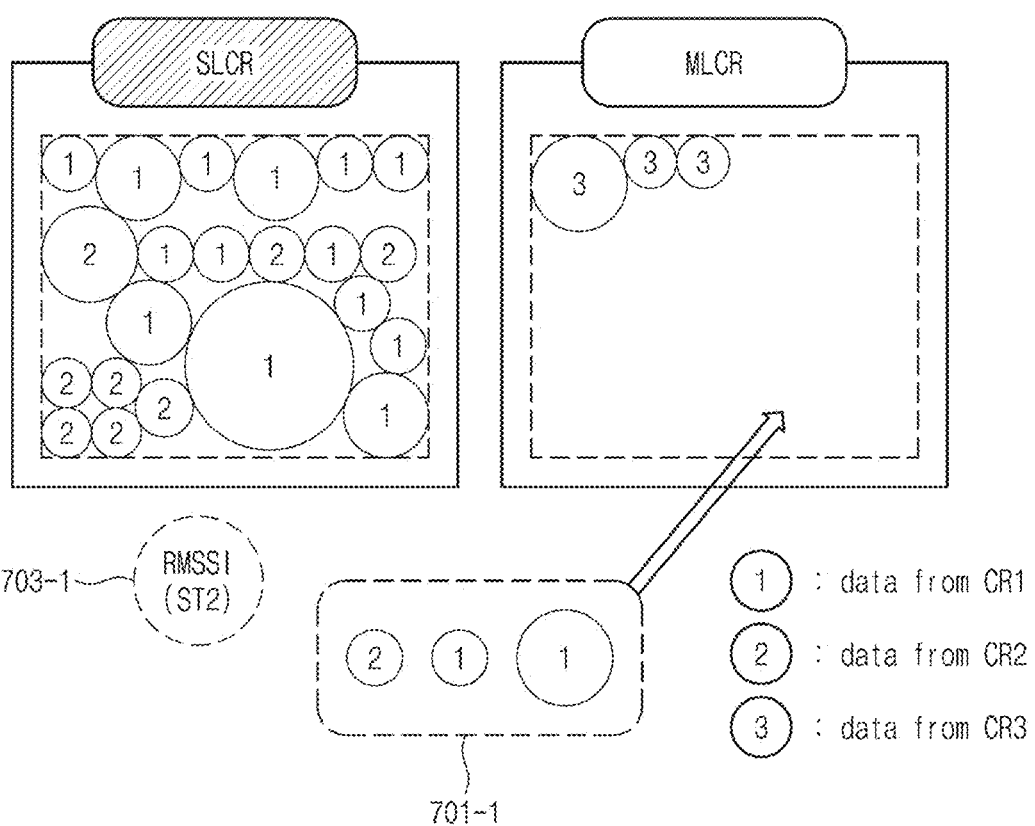

FIGS. 10A and 10B are diagrams illustrating an example of an operation of programming data from a host device (e.g., the host device of FIG. 8) in a first storage region of a storage device.

In FIGS. 10A and 10B, a storage controller may perform operations illustrated in FIGS. 10A and 10B based on a safety level-target storage region table (e.g., ST_MTBL-1 of FIG. 9). For example, the storage controller may identify a core ID of a host device, which transmits a program request, from the safety level-target storage region table and may retrieve a type of the safety level information SFTLI associated with a core corresponding to the core ID, a type of the remaining storage region information RMSSI, and a type of the target storage region.

Referring to FIGS. 10A and 10B, the single level cell region SLCR and the multi-level cell region MLCR of a non-volatile memory are illustrated, pieces of data from the cores CR1 and CR2 may be in a state of being stored in the single level cell region SLCR, and data from the core CR3 may be in a state of being stored in the multi-level cell region MLCR. Pieces of data 701 and 701-1 from the cores CR1 and CR2 may be programmed in the non-volatile memory.

A state 703 may indicate the size of the remaining region of the single level cell region SLCR.

As in the above manner described with reference to FIGS. 4 and 5A, the storage controller may program the pieces of data 701 and 701-1 from the cores CR1 and CR2 in the non-volatile memory. For example, based on the safety level-target storage region table, the storage controller may determine whether the safety level information SFTLI associated with a specific core indicates a first level (e.g., LEV1) and may determine whether the remaining storage region information RMSSI indicates a first state (e.g., ST1).

In the example illustrated in FIG. 10A, because the safety level information SFTLI associated with the cores CR1 and CR2 indicates the first level and the remaining storage region information RMSSI indicates the first state (703), the storage controller may program the pieces of data 701 from the first core CR1 and the second core CR2 in the single level cell region SLCR of the non-volatile memory.

In the example illustrated in FIG. 10B, because the safety level information SFTLI associated with the cores CR1 and CR2 indicates the first level and the remaining storage region information RMSSI indicates a second state (e.g., ST2) (703-1), the storage controller may program the pieces of data 701-1 from the first core CR1 and the second core CR2 in the multi-level cell region MLCR of the non-volatile memory.

Figure 11A:
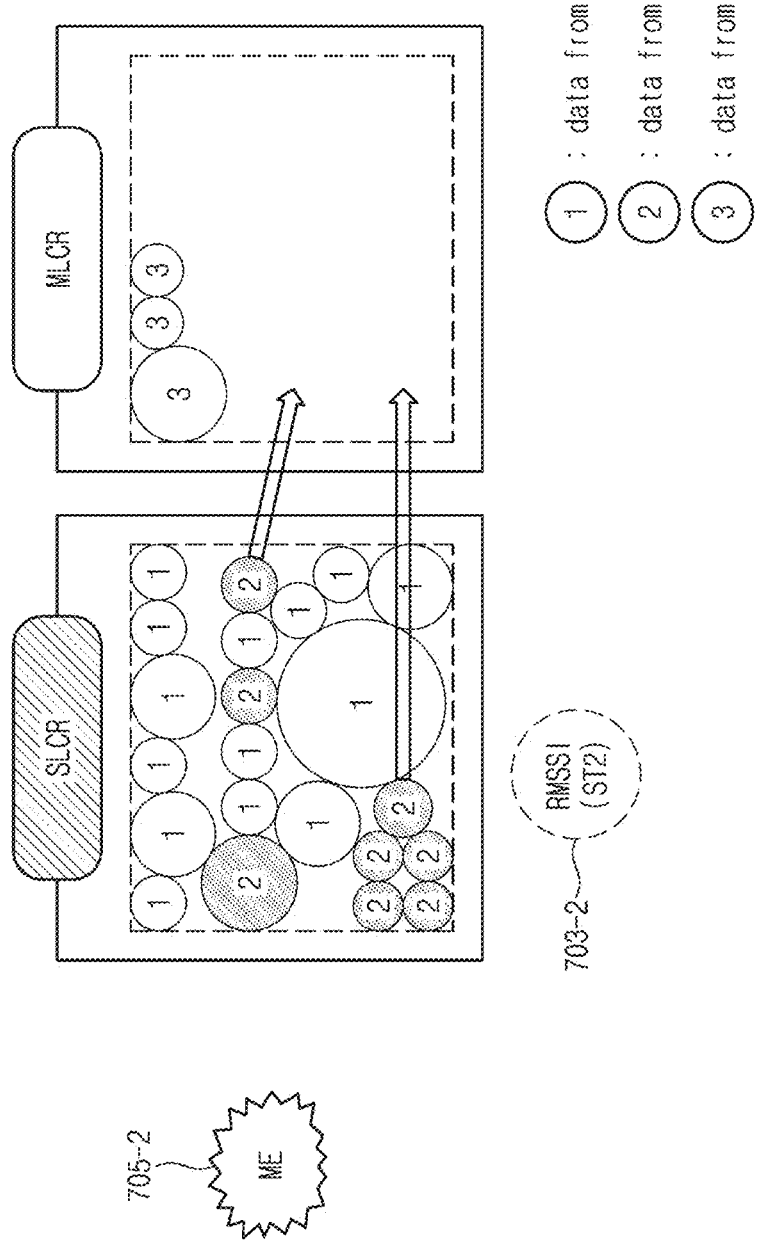
FIGS. 11A and 11B are diagrams illustrating an example of migrating data programmed in a first storage region to a second storage region of a storage device.
Figure 11B:
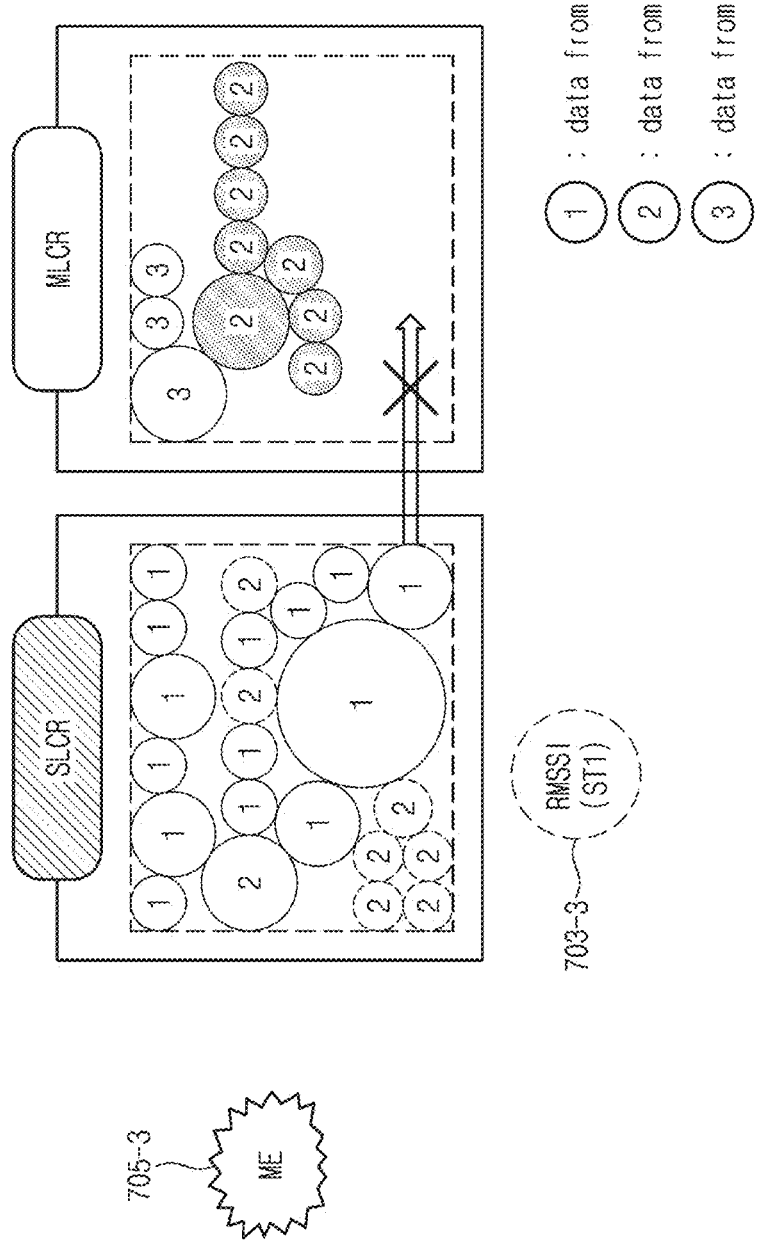

FIGS. 11A and 11B are diagrams illustrating an example of an operation of migrating data programmed in a first storage region (e.g., the data of FIGS. 10A and 10B) to a second storage region of a storage device.

In FIGS. 11A and 11B, a storage controller may perform operations illustrated in FIGS. 11A and 11B based on a mapping table (e.g., L2P_MTBL of FIG. 9). For example, the storage controller may search the mapping table for a type of the safety level information SFTLI and a type of the storage region ASR with regard to specific physical blocks.

Referring to FIGS. 11A and 11B, the single level cell region SLCR and the multi-level cell region MLCR of a non-volatile memory are illustrated, pieces of data from the cores CR1 and CR2 may be in a state of being stored in the single level cell region SLCR, and data from the core CR3 may be in a state of being stored in the multi-level cell region MLCR.

The storage controller may detect the occurrence of the migration event ME (705-2), and a state 703-2 may indicate the remaining storage region information RMSSI being the size of the remaining region of the single level cell region SLCR at a point in time when the migration event ME occurs.

As in the above description given with reference to FIGS. 6A and 6B, the storage controller may migrate data stored in the non-volatile memory. For example, based on the mapping table, the storage controller may determine whether the safety level information SFTLI associated with specific physical blocks indicates a first level (e.g., LEV1), may determine whether the storage region ASR is the single level cell region SLCR, and may determine whether the remaining storage region information RMSSI indicates the first state ST1.

In the example illustrated in FIG. 11A, because the safety level information SFTLI associated with the cores CR1 and CR2 indicates the first level, the storage region ASR is the single level cell region SLCR, and the remaining storage region information RMSSI indicates a second state (703-2), the storage controller may migrate the pieces of data from the first core CR1 and the second core CR2 to the multi-level cell region MLCR. In this case, the storage controller may determine the priorities of data targeted for migration based on the mapping table. For example, referring to FIG. 5C, the mapping table may include the safety level information SFTLI; referring to FIG. 9, the safety level information SFTLI may include the safety levels SFTL1 and SFTL2 and the level LEV1. Even though levels respectively associated with data from the first core CR1 and data from the second core CR2 are identical to each other, that is, correspond to LEV1, because the data from the core CR1 are indicated as the safety level SFTL1, the data from the core CR2 are indicated as the safety level SFTL2, and the safety level SFTLI is higher in importance than the safety level SFTL2, the storage controller may migrate the data (e.g., data shaded in FIG. 11A) from the second core CR2 to the multi-level cell region MLCR before the data from the first core CR1.

In some implementations, the safety level information SFTLI associated with a first core whose core ID is "CR1" and the safety level information SFTLI associated with a second core whose core ID is "CR2" indicate a first safety level (e.g., SFTL1) and a second safety level (e.g., SFTL2), respectively, and each of the first safety level and the second safety level may indicate a first level (e.g., LEV1). When a first storage region where first data from the first core and second data from the second core are stored is the single level cell region SLCR and when the remaining storage region information RMSSI indicates the second state at a point in time when a migration event occurs, the storage controller may first migrate the second data to the second storage region (e.g., the multi-level cell region MLCR) before the first data.

After the migration according to FIG. 11A is performed, in the example illustrated in FIG. 11B, because the safety level information SFTLI associated with the core CR1 indicates the first level, the storage region ASR is the single level cell region SLCR, and the remaining storage region information RMSSI indicates the first state (703-3), even though the migration event ME occurs (705-3), the storage controller may not migrate the first data from the first core CR1 to the multi-level cell region MLCR.

In some implementations, when the remaining storage region information RMSSI indicates the first state at a point in time when the second data are migrated to the second storage region, the storage controller may not migrate the first data to the second storage region.

Figure 12A:
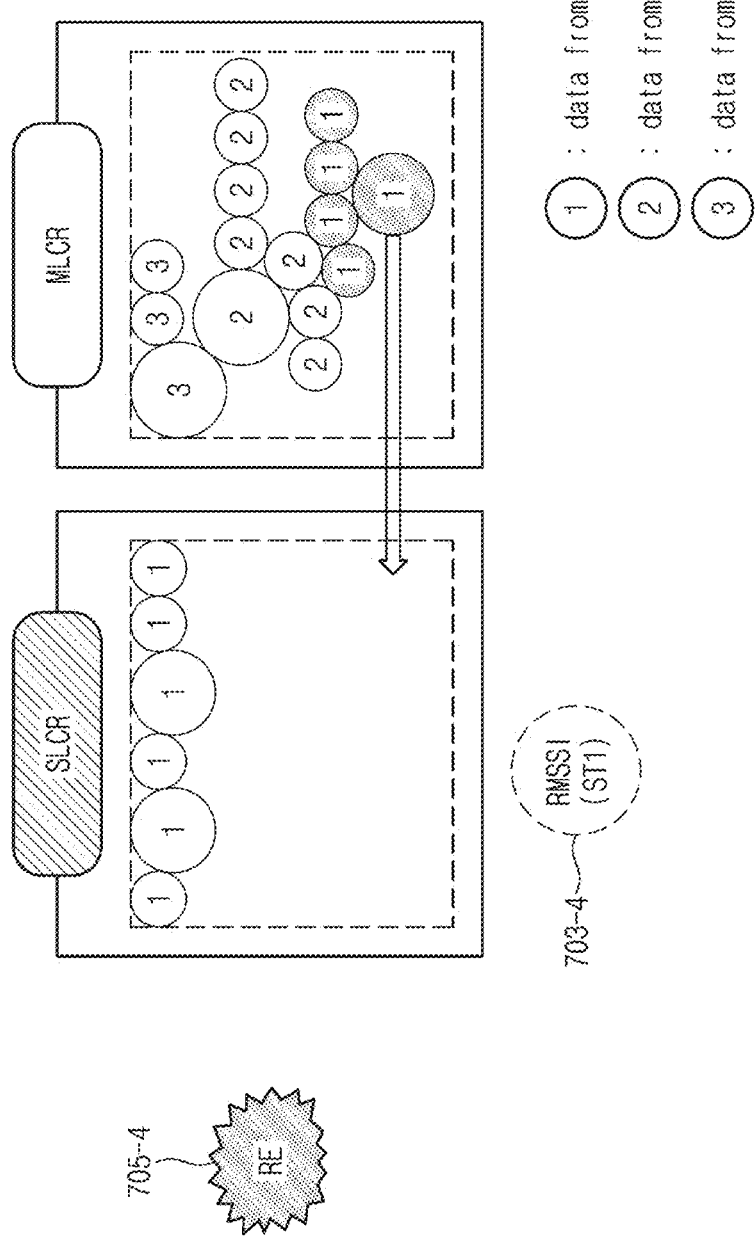
FIGS. 12A and 12B are diagrams illustrating an example of returning data migrated to a second storage region to a first storage region.
Figure 12B:
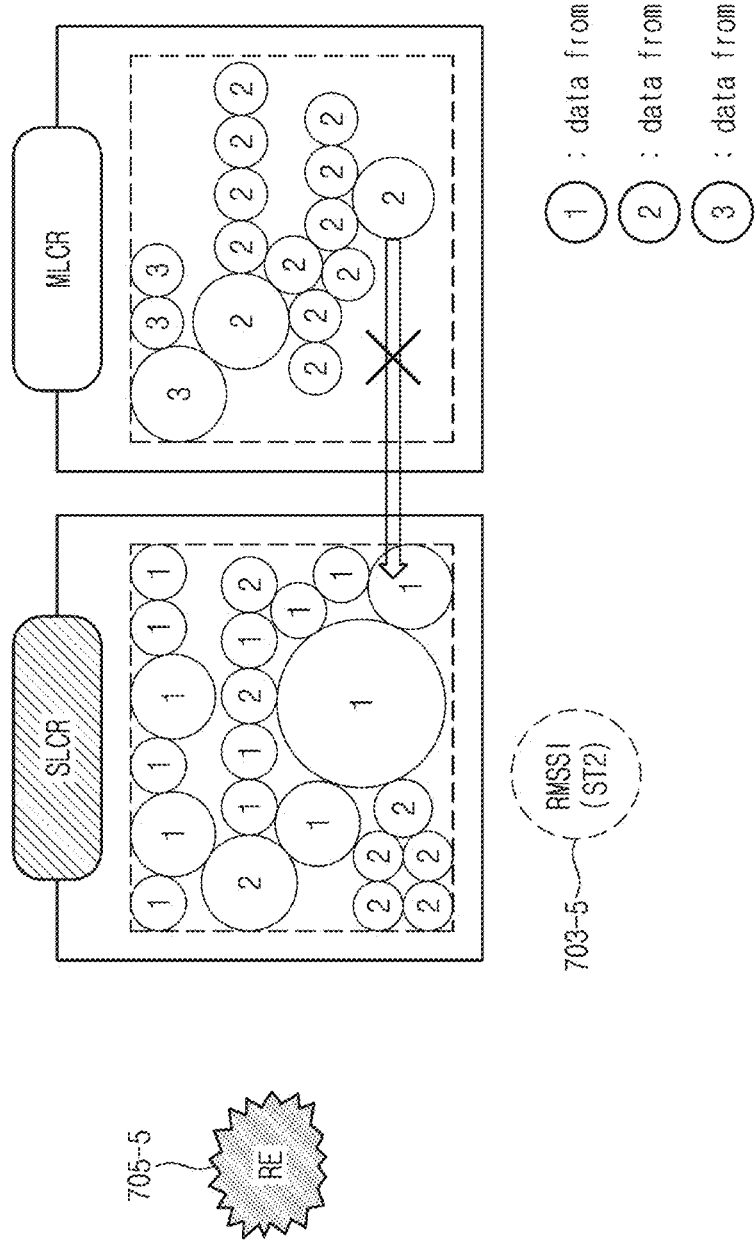

FIGS. 12A and 12B are diagrams for describing an example of an operation of returning data migrated to or stored in a second storage region (e.g., the data of FIGS. 11A and 11B) to a first storage region.

In FIGS. 12A and 12B, a storage controller may perform operations illustrated in FIGS. 12A and 12B based on a mapping table (e.g., L2P_MTBL of FIG. 9). For example, the storage controller may search the mapping table for a type of the safety level information SFTLI and a type of the storage region ASR with regard to specific physical blocks.

Referring to FIGS. 12A and 12B, the single level cell region SLCR and the multi-level cell region MLCR of a non-volatile memory are illustrated, pieces of data from the core CR1 may be in a state of being stored in the single level cell region SLCR, and data from the cores CR1, CR2, and CR3 may be in a state of being stored in the multi-level cell region MLCR.

The storage controller may detect the occurrence of the return event RE (705-4), and a state 703-4 may indicate the remaining storage region information RMSSI being the size of the remaining region of the single level cell region SLCR at a point in time when the return event RE occurs.

As in the above description given with reference to FIGS. 7A and 7B, the storage controller may return data stored in the non-volatile memory. For example, based on the mapping table, the storage controller may determine whether the safety level information SFTLI associated with specific physical blocks indicates a first level (e.g., LEV1), may determine whether the storage region ASR is not the single level cell region SLCR, and may determine whether the remaining storage region information RMSSI indicates the first state ST1.

In the example illustrated in FIG. 12A, because the safety level information SFTLI associated with the cores CR1 and CR2 indicates the first level, the storage region ASR is the multi-level cell region MLCR, and the remaining storage region information RMSSI indicates the first state ST1 (703-4), the storage controller may return pieces of data from the first core CR1 and the second core CR2 to the single level cell region SLCR. In this case, the storage controller may determine the priorities of data targeted for return based on the mapping table. For example, referring to FIG. 5C, the mapping table may include the safety level information SFTLI. Referring to FIG. 9, the safety level information SFTLI may include the safety levels SFTL1 and SFTL2 and the level LEV1. Even though levels respectively associated with data from the first core CR1 and data from the second core CR2 are identical to each other, that is, correspond to LEV1, because the data from the core CR1 are indicated as the safety level SFTL1, the data from the core CR2 are indicated as the safety level SFTL2, and the safety level SFTL1 is higher in importance than the safety level SFTL2, the storage controller may return the data (e.g., data shaded in FIG. 12A) from the first core CR1 to the single level cell region SLCR before the data from the second core CR2.

In some implementations, the safety level information SFTLI associated with a first core whose core ID is "CR1" and the safety level information SFTL1 associated with a second core whose core ID is "CR2" indicate a first safety level (e.g., SFTL1) and a second safety level (e.g., SFTL2), respectively, and each of the first safety level and the second safety level may indicate a first level (e.g., LEV1). When a second storage region to which first data from the first core and second data from the second core are migrated is the multi-level cell region MLCR and when the remaining storage region information RMSSI indicates the first state at a point in time when a return event occurs, the storage controller may first return the first data among the first data and the second data to the first storage region (e.g., the single level cell region SLCR) before the second data.

After the return according to FIG. 12A is performed, in the example illustrated in FIG. 12B, because the safety level information SFTLI associated with the core CR2 indicates the first level, the storage region ASR is the multi-level cell region MLCR, and the remaining storage region information RMSSI indicates the second state (703-5), even though the return event RE occurs (705-5), the storage controller may not return the second data from the second core CR2 to the single level cell region SLCR.

In some implementations, when the remaining storage region information RMSSI indicates the second state at a point in time when the first data are returned to the first storage region, the storage controller may not return the second data to the first storage region.

Figure 13:
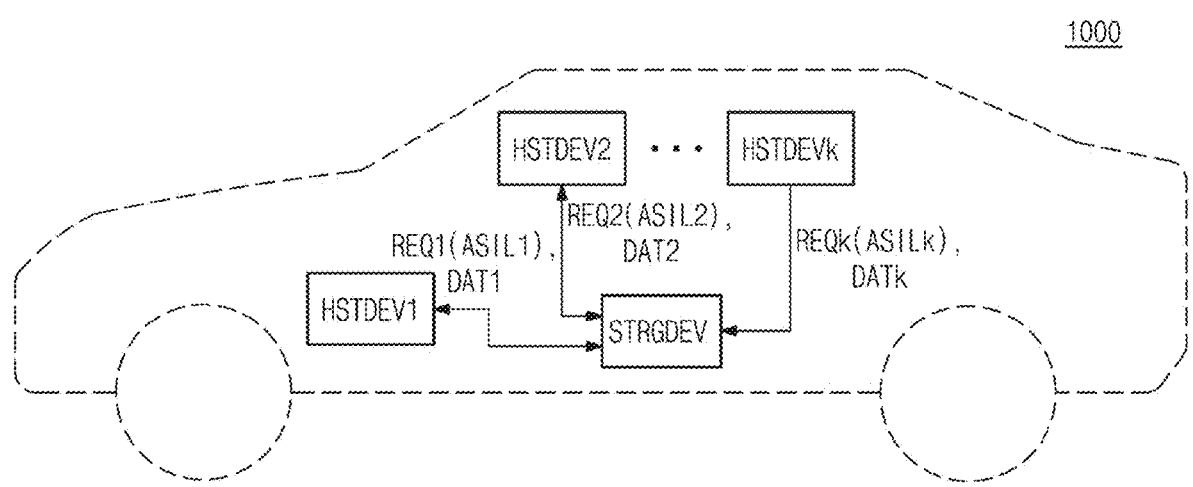
FIG. 13 is a block diagram illustrating a vehicle system including a storage device according to some implementations of the present disclosure.

FIG. 13 is a block diagram illustrating a vehicle system including a storage device according to some implementations of the present disclosure.

Referring to FIG. 13, a vehicle system 1000 may be mounted on an autonomous vehicle. The vehicle system 1000 may include a plurality of host devices HSTDEV1, HSTDEV2, . . . , HSTDEVk (k being an integer of 3 or more) and a storage device STRGDEV.

Each of the plurality of host devices HSTDEV1, HSTDEV2, . . . , HSTDEVK may correspond to the host device 100 or 100a of FIG. 1 or 8, and the storage device STRGDEV may correspond to the storage device 300 or 10a of FIG. 1 or 8. Accordingly, the vehicle system 1000 may include host devices or cores which are distinguished from each other by the device ID 110 or the core IDs 151-1, 153-1, and 157-1 as described with reference to FIG. 1 or 8. The storage device STRGDEV may include the safety level-target storage region table 315 or 315a and the mapping table 317 of FIG. 1 or 8.

In some implementations, the autonomous vehicle may be a vehicle capable of navigating and operating on its own without human intervention. The autonomous vehicle may be classified depending on the degree of autonomy and may include various sensors including a camera, a radar, a LiDAR, an ultrasonic sensor, and a global positioning system (GPS), a recognition system, a decision making system, a control system, a communication system, a human-machine interface (HMI), and a safety system. The sensor may collect data about the surroundings of the autonomous vehicle, such as a location of another vehicle, a pedestrian, a road sign, and an obstacle, while driving, the recognition system may identify, classify, and predict objects, and the decision-making system may perform appropriate determination by analyzing recognition data by the recognition system. The control system may control steering, acceleration, and braking mechanisms of the autonomous vehicle, the communication system may communicate with other autonomous vehicles or transportation infrastructure systems, the human-machine interface may provide interaction between the autonomous vehicle and the driver, and the safety system may provide a function of prioritizing the safety of the driver in the event of an error or unexpected situation of the autonomous vehicle. For example, the plurality of host devices HSTDEV1, HSTDEV2, . . . , HSTDEVK may include the sensor, the recognition system, the decision-making system, the control system, the communication system, and the safety system and may exchange data DAT1, DAT2, . . . , DATk with the storage device STRGDEV in real time while the autonomous vehicle is traveling.

In some implementations, each of the plurality of host devices HSTDEV1, HSTDEV2, . . . , and HSTDEVk may transmit requests REQ1, REQ2, . . . , REQk for exchanging the data DAT1, DAT2, . . . , and DATk with the storage device STRDEV and may transmit the ASIL information described above with reference to FIG. 1 together with the requests REQ1, REQ2, . . . , REQk. For example, the host device HSTDEV1 may transmit ASIL information ASIL1 to the storage device STRGDEV together with the request REQ1, the host device HSTDEV2 may transmit ASIL information ASIL2 to the storage device STRGDEV together with the request REQ2, and the host device HSTDEVk may transmit ASIL information ASILk to the storage device STRGDEV together with the request REQk.

In some implementations, the ASIL information transmitted from each of the plurality of host devices HSTDEV1, HSTDEV2, . . . , and HSTDEVk may correspond to the safety levels SFTL1, SFTL2, and SFTL3 described above with reference to FIG. 9. The description is given with reference to FIG. 9 as the safety levels SFTL1, SFTL2, and SFTL3 correspond to each core. However, as illustrated in FIG. 13, the ASIL information may be set for each host device; in this case, pieces of data from one or more host devices may be set in a safety level-target storage region table to correspond to one level as illustrated in FIG. 9.

Figure 14:
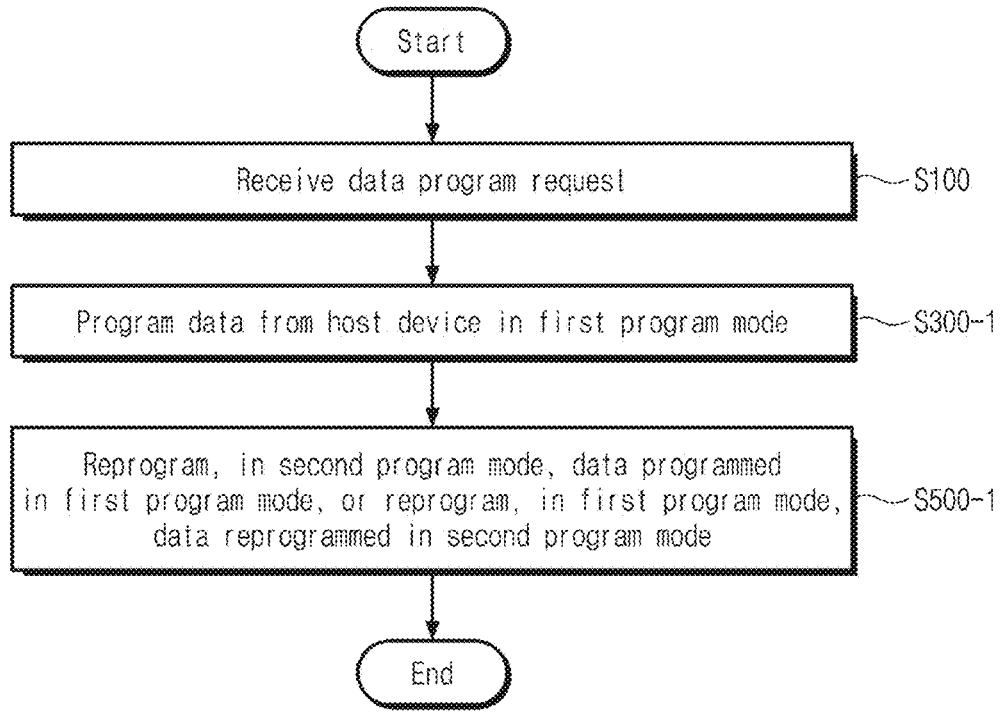
FIG. 14 is a flowchart illustrating an operating method of a storage device according to some implementations of the present disclosure.

FIG. 14 is a flowchart illustrating an operating method of a storage device according to some implementations of the present disclosure.

Referring to FIG. 14, an electronic system may include a host device and a storage device. The storage device may include a storage controller and a non-volatile memory. The non-volatile memory may include a plurality of storage regions, and the plurality of storage regions may include a first storage region and a second storage region.

In an operation method of the storage device, a data program request may be received from the host device (S100).

The storage device may program data from the host device in the first storage region in a first program mode, based on ASIL information of the host device and remaining storage region information of the non-volatile memory (S300-1).

In some implementations, the programming of the data in the first program mode may mean programming data in a single level cell region of the non-volatile memory; in this case, the programming of data in a second program mode may mean programming data in a multi-level cell region of the non-volatile memory. However, the present disclosure is not limited thereto. The programming of the data in the first program mode may mean programming data in a multi-level cell region of the non-volatile memory; in this case, the programming of the data in the second program mode may mean programming data in a single level cell region of the non-volatile memory.

Based on the ASIL information and the remaining storage region information, the storage device may reprogram the data programmed in the first program mode in the second storage region in the second program mode or may again reprogram the data reprogrammed in the second program mode in the first storage region in the first program mode (S500-1).

In some implementations, operation S300-1 and operation S500-1 may respectively correspond to operation S300 and operation S500 described with reference to FIG. 4.

Figure 15:
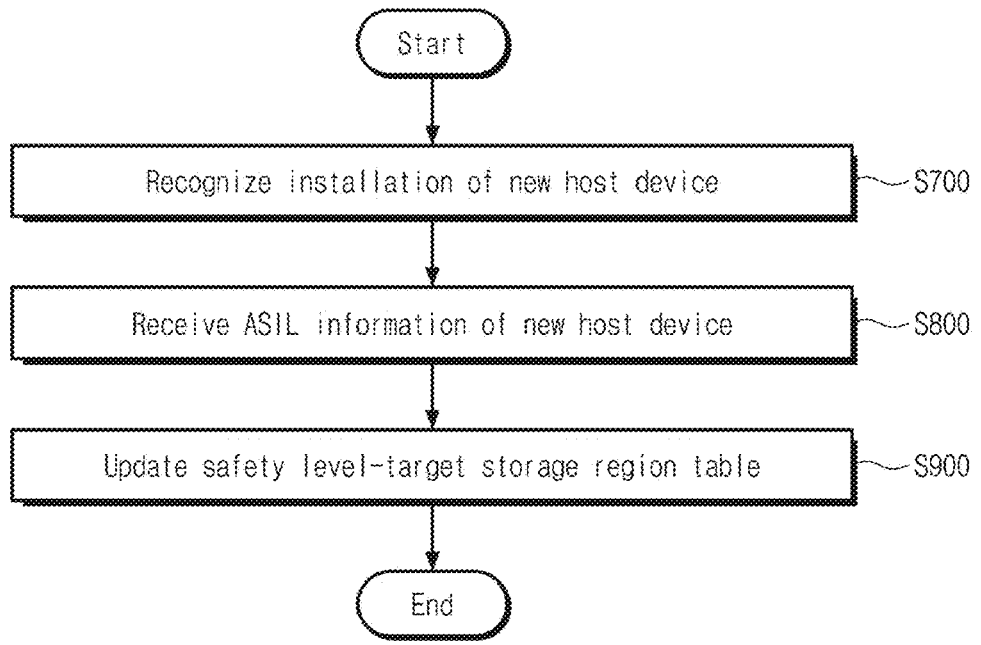
FIG. 15 is a flowchart illustrating an operating method of a storage device according to some implementations of the present disclosure.

FIG. 15 is a flowchart illustrating an operating method of a storage device according to some implementations of the present disclosure.

Referring to FIGS. 14 and 15, in the operating method of the storage device, the storage device may recognize the installation of a new host device (S700).

The storage device may receive ASIL information of the new host device from the new host device (S800).

The storage device may update a safety level-target storage region table based on the ASIL information received from the new host device (S900).

In some implementations, when the new host device is installed, data from the new host device may be programmed in a non-volatile memory based on the updated safety level-target storage region table, and the migration of the programmed data or the return of the migrated data may be performed based on a mapping table.

Figure 16:
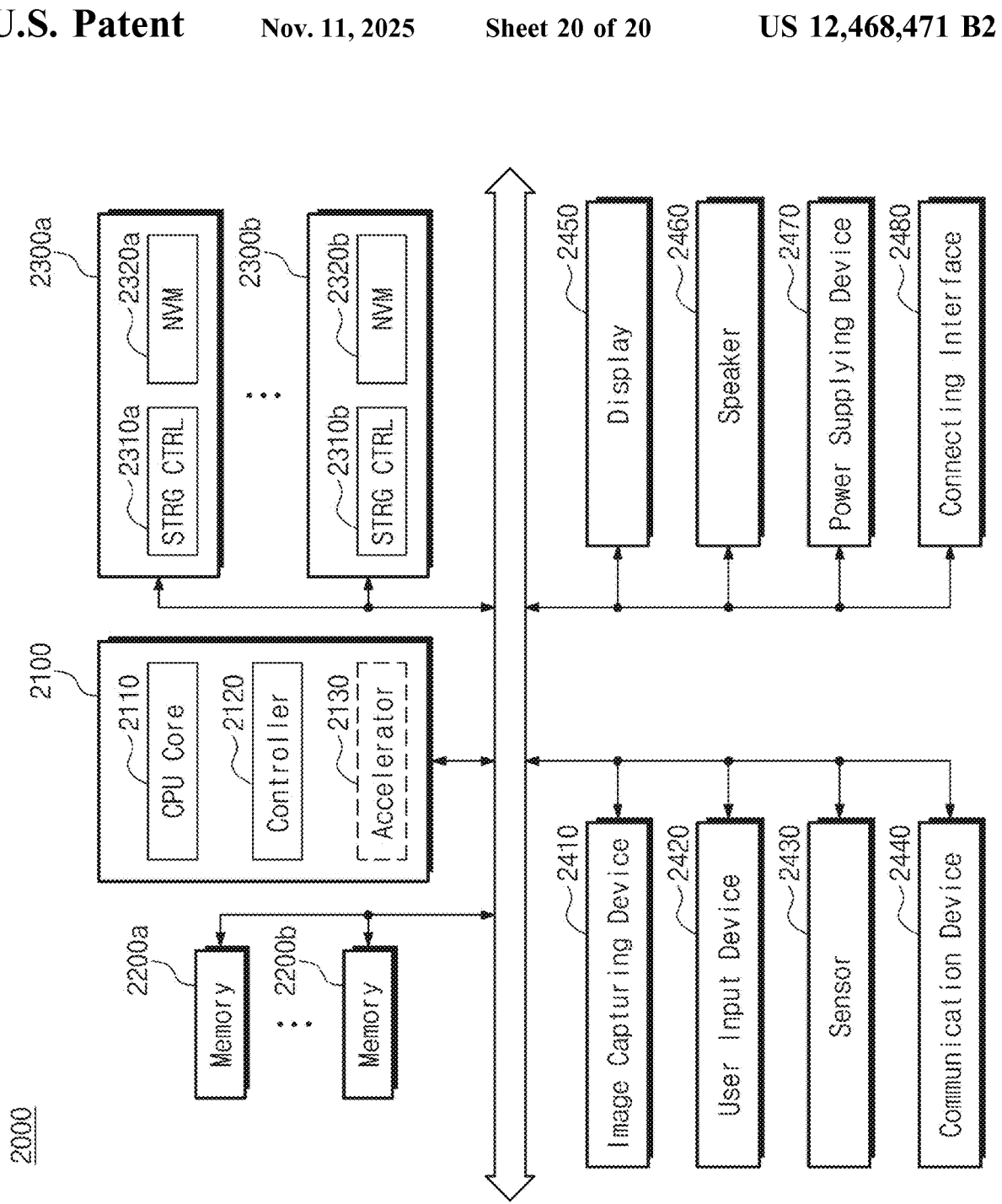
FIG. 16 is a diagram illustrating an electronic system including a storage device according to some implementations of the present disclosure.

FIG. 16 is a diagram of an electronic system 2000 to which a storage device is applied, according to some implementations.

The electronic system 2000 may include a plurality of storage devices (e.g., 300 of FIG. 1, 300a of FIG. 8, STRGDEV of FIG. 13) according to some implementations of the present disclosure. The system 2000 of FIG. 16 may be a mobile system, such as a portable communication terminal (e.g., a mobile phone), a smartphone, a tablet personal computer (PC), a wearable device, a healthcare device, or an Internet of things (IoT) device. However, the system 2000 of FIG. 16 is not necessarily limited to the mobile system and may be a PC, a laptop computer, a server, a media player, or an automotive device (e.g., a navigation device).

Referring to FIG. 16, the system 2000 may include a main processor 2100, memories (e.g., 2200a and 2200b), and storage devices (e.g., 2300a and 2300b). In addition, the system 2000 may include at least one of an image capturing device 2410, a user input device 2420, a sensor 2430, a communication device 2440, a display 2450, a speaker 2460, a power supplying device 2470, and a connecting interface 2480.

The main processor 2100 may control all operations of the system 2000, more specifically, operations of other components included in the system 2000. The main processor 2100 may be implemented as a general-purpose processor, a dedicated processor, or an application processor.

The main processor 2100 may include at least one CPU core 2110 and further include a controller 2120 configured to control the memories 2200a and 2200b and/or the storage devices 2300a and 2300b. In some embodiments, the main processor 2100 may further include an accelerator 2130, which is a dedicated circuit for a high-speed data operation, such as an artificial intelligence (AI) data operation. The accelerator 2130 may include a graphics processing unit (GPU), a neural processing unit (NPU) and/or a data processing unit (DPU) and be implemented as a chip that is physically separate from the other components of the main processor 2100.

The memories 2200a and 2200b may be used as main memory devices of the system 2000. Although each of the memories 2200a and 2200b may include a volatile memory, such as static random access memory (SRAM) and/or dynamic RAM (DRAM), each of the memories 2200a and 2200b may include non-volatile memory, such as a flash memory, phase-change RAM (PRAM) and/or resistive RAM (RRAM). The memories 2200a and 2200b may be implemented in the same package as the main processor 2100.

The storage devices 2300a and 2300b may serve as non-volatile storage devices configured to store data regardless of whether power is supplied thereto, and have larger storage capacity than the memories 2200a and 2200b. The storage devices 2300a and 2300b may respectively include storage controllers (STRG CTRL) 2310a and 2310b and NVM (Non-Volatile Memory) s 2320a and 2320b configured to store data via the control of the storage controllers 2310a and 2310b. Although the NVMs 2320a and 2320b may include flash memories having a two-dimensional (2D) structure or a three-dimensional (3D) V-NAND structure, the NVMs 2320a and 2320b may include other types of NVMs, such as PRAM and/or RRAM.

The storage devices 2300a and 2300b may be physically separated from the main processor 2100 and included in the system 2000 or implemented in the same package as the main processor 2100. In addition, the storage devices 2300a and 2300b may have types of solid-state devices (SSDs) or memory cards and be removably combined with other components of the system 200 through an interface, such as the connecting interface 2480 that will be described below. The storage devices 2300a and 2300b may be devices to which a standard protocol, such as a universal flash storage (UFS), an embedded multi-media card (eMMC), or a non-volatile memory express (NVMe), is applied, without being limited thereto.

The image capturing device 2410 may capture still images or moving images. The image capturing device 2410 may include a camera, a camcorder, and/or a webcam.

The user input device 2420 may receive various types of data input by a user of the system 2000 and include a touch pad, a keypad, a keyboard, a mouse, and/or a microphone.

The sensor 2430 may detect various types of physical quantities, which may be obtained from the outside of the system 2000, and convert the detected physical quantities into electric signals. The sensor 2430 may include a temperature sensor, a pressure sensor, an illuminance sensor, a position sensor, an acceleration sensor, a biosensor, and/or a gyroscope sensor.

The communication device 2440 may transmit and receive signals between other devices outside the system 2000 according to various communication protocols. The communication device 2440 may include an antenna, a transceiver, and/or a modem.

The display 2450 and the speaker 2460 may serve as output devices configured to respectively output visual information and auditory information to the user of the system 2000.

The power supplying device 2470 may appropriately convert power supplied from a battery (not shown) embedded in the system 2000 and/or an external power source, and supply the converted power to each of components of the system 2000.

The connecting interface 2480 may provide connections between the system 2000 and an external device that is connected to the electronic system 2000 and may transfer data to and from the electronic system 2000. The connecting interface 2480 may be implemented in a variety of interface schemes, such as Advanced Technology Attachment (ATA), Serial ATA (SATA), external SATA (e-SATA), SCSI (Small Computer Small Interface), SAS (Serial Attached SCSI), PCI (Peripheral Component Interconnection), PCIe (PCI express), NVMe, IEEE 1394, USB (universal serial bus), SD (secure digital) card, MMC (multi-media card), eMMC, UFS, eUFS (embedded Universal Flash Storage), CF (compact flash) card interface, etc.

Each of the storage devices 2300a and 2300b may correspond to the storage devices 300 and 300a described above with reference to FIG. 1 or FIG. 8. Accordingly, each of the storage devices 2300a and 2300b may manage data from host devices based on safety level information of the host device and remaining storage region information of a non-volatile memory. In this case, each of the image capturing device 2410, the user input device 2420, the sensor 2430, the communication device 2440, the display 2450, the speaker 2460, the power supplying device 2470, and the connecting interface 2480 may be the host device.

As described above, based on safety level information and remaining storage region information, a storage device according to some implementations of the present disclosure may program data with high importance in a single level cell region and may program data with low importance in a multi-level cell region. Even though the importance of data is high, the data may be temporarily programmed in or migrated to the multi-level cell region depending on the size of the remaining region at a point in time when the data are to be programmed or at a point in time when the migration event occurs, but finally, the storage device may return the data with the high importance to the single level cell region and may first return the data of the high importance to the single level cell region before data with low importance. Accordingly, the storage device may secure the reliability of data and a latency of data by managing pieces of data such that data with high importance are kept in the single level cell region as much as possible and data with low importance are kept in the multi-level cell region, and may efficiently store and manage pieces of data in consideration of safety level information according to purposes and functions of one or more host devices in a vehicle system.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

While the present disclosure has been described with reference to various implementations thereof, it will be apparent to those of ordinary skill in the art that various changes and modifications may be made thereto without departing from the spirit and scope of the present disclosure as set forth in the following claims.

What is claimed is:

1. A storage device comprising:
a non-volatile memory including a plurality of storage regions including a first storage region and a second storage region, wherein types of the first and second storage regions are different from one another; and
a storage controller configured to:
based on at least one of safety level information of a host device or remaining storage region information of the non-volatile memory, program data from the host device in the first storage region; and
based on the safety level information and the remaining storage region information, migrate the data programmed in the first storage region to the second storage region, or return the data, previously programmed in the first storage region and migrated to the second storage region, to the first storage region.

2. The storage device of claim 1, wherein the safety level information indicates a first level, and
wherein programming the data from the host device in the first storage region comprises:
identifying a storage state indicated by the remaining storage region information, based on the safety level information indicating the first level; and
programming the data from the host device in the first storage region based on the storage state indicated by the remaining storage region information.

3. The storage device of claim 2, wherein the first storage region is a single level cell region.

4. The storage device of claim 1, wherein the safety level information indicates a second level, and
wherein programming the data from the host device in the first storage region comprises:
programming the data in the first storage region based on the safety level information indicating the second level and regardless of a storage state indicated by the remaining storage region information,
wherein the first storage region is a multi-level cell region.

5. The storage device of claim 1, when the first storage region is a single level cell region, and
wherein the storage controller is configured to migrate the data programmed in the first storage region to the second storage region, based on the remaining storage region information indicating a second storage state at a point in time when a migration event occurs,
wherein the second storage state corresponds to an insufficient level of storage in the first storage region.

6. The storage device of claim 5, wherein the storage controller is configured to:

apply enhanced data protection policies to the data migrated to the second storage region.

7. The storage device of claim 5, wherein the storage controller is configured to:
return the data migrated to the second storage region to the first storage region, based on the remaining storage region information indicating a first storage state at a point in time when a return event occurs, wherein the first storage state corresponds to a sufficient level of storage in the first storage region.

8. The storage device of claim 1, wherein the host device includes a first core outputting first data and a second core outputting second data,
wherein the data from the host device include the first data and the second data, and
wherein the safety level information includes a first safety level associated with the first data and a second safety level associated with the second data.

9. The storage device of claim 8, wherein each of the first safety level and the second safety level is associated with a first level, and
wherein programming the data from the host device in the first storage region comprises:
identifying a first storage state indicated by the remaining storage region information, based on each of the first safety level and the second safety level being associated with the first level; and
programming the first data and the second data in the first storage region based on the first storage state indicated by the remaining storage region information.

10. The storage device of claim 9, wherein the first storage region is a single level cell region.

11. The storage device of claim 10, wherein the storage controller is configured to migrate at least one of the first data or the second data programmed in the first storage region to the second storage region based on the remaining storage region information indicating a second storage state at a point in time when a migration event occurs, and
when the storage controller is configured to migrate the second data to the second storage region before the first data based on the first safety level and the second safety level.

12. The storage device of claim 11, wherein the storage controller is configured to, based on the remaining storage region information indicating the first storage state after the second data is migrated to the second storage region, not migrate the first data to the second storage region.

13. The storage device of claim 11, wherein the storage controller is configured to, based on the remaining storage region information indicating the first storage state at a point in time when a return event occurs, and based on the first safety level and the second safety level, return the first data migrated to the second storage region to the first storage region before the second data.

14. The storage device of claim 13, wherein the storage controller is configured to, based on the remaining storage region information indicating the second storage state after the first data is returned to the first storage region, not return the second data to the first storage region.

15. The storage device of claim 8, wherein the host device includes a third core outputting third data,
wherein the data from the host device includes the third data,
wherein the safety level information includes a third safety level associated with the third data, wherein each of the first safety level and the second safety level is associated with a first level, and the third safety level is associated with a second level, and
wherein the storage controller is configured to:
based on the remaining storage region information indicating a first storage state, program the first data and the second data in the first storage region, wherein the first storage region is a single level cell region, and program the third data in the second storage region, wherein the second storage region is a multi-level cell region; and
based on the remaining storage region information indicating a second state at a point in time when a migration event occurs, migrate the second data to the second storage region before the first data.

16. A method of controlling a storage device, the method comprising:
programming data from a host device in a first storage region, based on at least one of safety level information of the host device or remaining storage region information of a non-volatile memory, wherein the non-volatile memory includes a plurality of storage regions, and the plurality of storage regions include the first storage region and a second storage region, wherein the first storage region and the second storage regions are different types of storage region;
migrating the data programmed in the first storage region to the second storage region, based on the safety level information and remaining storage region information of the non-volatile memory; and
returning the data migrated to the second storage region to the first storage region, based on the safety level information and the remaining storage region information.

17. The method of claim 16, wherein programming the data from the host device in the first storage region comprises:
based on the safety level information indicating a first level and the remaining storage region information indicating a first storage state, programming the data from the host device in the first storage region, wherein the first storage region is a single level cell region, or
based on the safety level information indicating the first level and the remaining storage region information indicating a second storage state, programming the data from the host device in the first storage region, wherein the first storage region is a multi-level cell region.

18. The method of claim 16, wherein the first storage region is a single level cell region, and wherein migrating the data programmed in the first storage region to the second storage region comprises:
based on the remaining storage region information indicating a second storage state at a point in time when a migration event occurs, migrating the data programmed in the first storage region to the second storage region, wherein the second storage state corresponds to an insufficient level of storage in the first storage region.

19. The method of claim 18, wherein returning the data migrated to the second storage region to the first storage region comprises:
based on the remaining storage region information indicating a first storage state at a point in time when a return event occurs, returning the data migrated to the second storage region to the first storage region, wherein the first storage state corresponds to a sufficient level of storage in the first storage region.

20. A storage device comprising:

a non-volatile memory including a plurality of storage regions including a first storage region and a second storage region, wherein types of the first and second storage regions are different from one another; and a storage controller configured to:

based on at least one of automotive safety integrity level (ASIL) information of a host device or remaining storage region information of the non-volatile memory, program data from the host device in the first storage region in a first program mode; and based on the ASIL information and the remaining storage region information, reprogram the data programmed in the second storage region in the first program mode in the second storage region in a second program mode, or reprogram the data, previously reprogrammed in the second storage region in the second program mode, in the first storage region in the first program mode.

* * * * *